United States Patent [19]

Sawano et al.

[11] Patent Number: 5,737,005
[45] Date of Patent: Apr. 7, 1998

[54] METHOD AND APPARATUS FOR THERMAL RECORDING AND THERMAL TRANSFER RECORDING IN MULTICOLOR SYSTEM

[75] Inventors: Yukio Sawano; Souhei Shibasaki, both of Tokyo; Shuzo Hanaoka; Masaaki Hashizume, both of Nagano, all of Japan

[73] Assignees: Fuji Photo Film Co., Ltd., Kanagawa; Nagano Japan Radio Co., Ltd., Nagano, both of Japan

[21] Appl. No.: 621,454

[22] Filed: Mar. 25, 1996

[30] Foreign Application Priority Data

| Mar. 24, 1995 | [JP] | Japan | 7-90080 |
| Mar. 24, 1995 | [JP] | Japan | 7-90081 |
| Mar. 24, 1995 | [JP] | Japan | 7-90082 |

[51] Int. Cl.$^6$ ............ G01D 15/00; G01D 15/10; B41J 15/00; B41J 17/00
[52] U.S. Cl. ............ 347/172; 347/171; 347/217; 347/221
[58] Field of Search ............ 347/171, 172, 347/217, 221

[56] References Cited

U.S. PATENT DOCUMENTS

| Re. 33,525 | 1/1991 | Kohashi | 347/172 |
| 4,541,042 | 9/1985 | Kohashi | 347/172 |
| 4,760,405 | 7/1988 | Nagira et al. | 347/217 |
| 5,216,438 | 6/1993 | Nakao et al. | 347/172 |

OTHER PUBLICATIONS

Patent Abstracts of Japan, Publication No. 57210872 A, Dec. 24, 1982 (abstract).

Primary Examiner—Peter S. Wong
Assistant Examiner—Bao Q. Vu
Attorney, Agent, or Firm—Sughrue, Mion, Zinn, Macpeak & Seas, PLLC

[57] ABSTRACT

A method and an apparatus for thermal recording and thermal transfer recording in a multicolor system. After performing the thermal recording, the thermal transfer recording is performed by overlaying a portion thermally recorded already. A thermal transfer donor sheet has a thermal transfer layer containing a desensitizer for suppressing a coloring reaction in the thermal recording layer of the thermal recording sheet. In performing multicolor recording by overlapping images of plural documents, after an image of a first document has been thermally recorded on a recording sheet, an image of a second document is recorded on the same recording sheet by thermal transfer recording. No color mixture occurs between colors thermally recorded and thermally transferred respectively and bright and clear color development can be obtained.

13 Claims, 18 Drawing Sheets

FIG. 13
DOCUMENT A
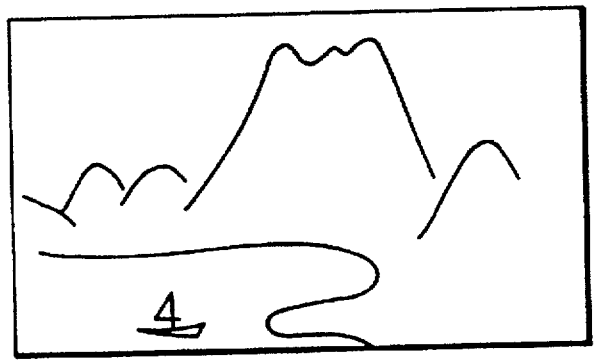
+
DOCUMENT B
⇩
SYNTHESIZED IMAGE
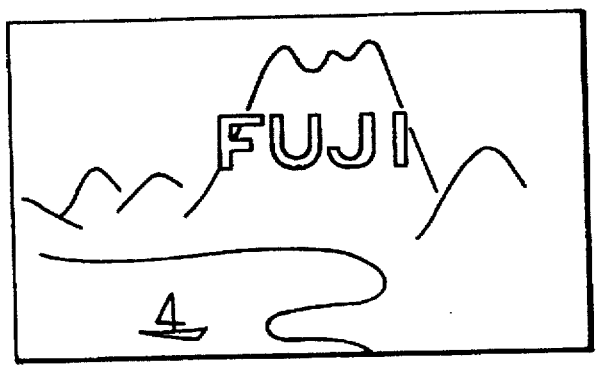

METHOD AND APPARATUS FOR THERMAL RECORDING AND THERMAL TRANSFER RECORDING IN MULTICOLOR SYSTEM

BACKGROUND OF THE INVENTION

1. Field of the Invention

This invention relates to a method and an apparatus for thermal recording and thermal transfer recording in a multicolor system, in which multicolor recording is performed by using both thermal recording and the thermal transfer recording in combination. It also relates to a method and an apparatus for thermal recording and thermal transfer recording in a multicolor system, in which multicolor recording is performed by synthesizing images of plural documents.

2. Related Art

A recording apparatus has been proposed in Unexamined Japanese Patent Publication (KOKAI) No. 57-210872 which performs thermal recording on a thermal recording sheet using a thermal head as well as thermal transfer recording by overlaying a thermal transfer donor sheet (hereinbelow, referred to as an ink ribbon) on the thermal recording sheet.

In such a proposal, three primary color portions for red, blue and yellow, and a colorless portion are formed on the ink ribbon with constant spaces (referred to as a full-color system). During operation, a desired color portion on the ink ribbon is conducted between the thermal head and the thermal recording sheet so that printing can be performed. In details, each of color portions for red, blue and yellow on the ink ribbon is selectively overlaid on the thermal recording sheet (heat-sensitive paper or thermosensible paper) and heated by the thermal head, so that ink on the ink ribbon is thermally transferred onto the thermal recording sheet. The colorless portion on the ink ribbon is overlaid on the thermal recording sheet and heated by the thermal head so that an image can be developed on the thermal recording sheet with a certain color.

The use of such a recording mechanism, however, causes a thermal recording layer of the thermal recording sheet to thermally develop with the color at the same time due to heat generated when thermal transfer is performed with the ink ribbon, and a problem arises that clear color developments can not be obtained due to color mixture between colors developed by the thermal recording and printed by the thermal transfer recording, respectively.

Particularly, where print-out is made by overlapping images of plural documents, a thermal recording region and a thermal transfer recording region for recording images of different documents can often overlap with each other. In this case, the conventional apparatus as aforementioned can not prevent color mixture between the overlapped portions.

Further, there has been raised another problem that the ink ribbon is wasteful because different color portions and a colorless portion need to be on the ink ribbon individually. In other words, the ink ribbon has to be fed by a prescribed length after the recording operation for a certain color was performed through a prescribed distance even if another color portion or portions are not used in this recording operation.

SUMMARY OF THE INVENTION

The present invention has been accomplished under the circumstances as aforementioned, and an object thereof is to provide a method for thermal recording and thermal transfer recording in a multicolor system, which can obtain clear color development without color mixture between portions developed by the thermal recording and printed by the thermal transfer recording, respectively.

Another object of the present invention is to provide a method for thermal recording and thermal transfer recording in a multicolor system, which can use an ink ribbon most efficiently.

Still another object of the present invention is to provide a method for thermal recording and thermal transfer recording in a multicolor system, which can obtain clear color development without color mixture between portions developed by the thermal recording and printed by the thermal transfer recording, respectively, even when printout is made by overlapping images of plural documents.

Yet another object of the present invention is to provide an apparatus for thermal recording and thermal transfer recording in a multicolor system, which can obtain clear color development without color mixture between portions developed by the thermal recording and printed by the thermal transfer recording, respectively.

Yet another object of the present invention is to provide an apparatus for thermal recording and thermal transfer recording in a multicolor system, which can obtain clear color development without color mixture between portions developed by the thermal recording and printed by the thermal transfer recording, respectively, even when multicolor recording is performed by synthesizing images of plural documents.

The first and second objects of the present invention are attained by the provision of a method for thermal recording and thermal transfer recording in a multicolor system, in which multicolor recording is performed on a thermal recording sheet composed of a support and a thermal recording layer thereon by using both the thermal recording and the thermal transfer recording in combination, comprising the steps of:

(a) performing thermal recording in a recording region on the thermal recording sheet by a thermal head;

(b) arranging a thermal transfer donor sheet for thermal transfer recording on the recording region of the thermal recording sheet, the thermal transfer donor sheet having a thermal transfer layer containing a desensitizer for preventing or suppressing a coloring reaction on the thermal recording layer; and (c) contacting a thermal head with the face of the thermal transfer donor sheet so that the thermal transfer recording is performed in the recording region thermally recorded already.

In the present invention, after performing the thermal recording on the thermal recording sheet, the thermal transfer recording is performed on the thermal sheet (heat-sensitive paper) using the thermal transfer donor sheet containing a desensitizer for preventing the thermal sheet from being thermally developed. Accordingly, a bright and clear multicolor printing can be obtained without color mixture between portions developed by the thermal recording and printed by the thermal transfer recording, respectively. Further, the thermal recording is performed prior to the thermal transfer recording, so that a color dye or pigment and waxes transferred onto the paper by the thermal transfer from the ink ribbon recording do not adhere to the thermal head, and so that clear prints can be obtained at all times. This also makes the recording apparatus compact because only one thermal head is required.

Furthermore, there is no need to form a colorless region on the thermal transfer donor sheet, so that the thermal transfer donor sheet can be used more effectively than the conventional.

The third object of the present invention is attained by the provision of a method for thermal recording and thermal transfer recording in a multicolor system, in which multicolor recording is performed on a thermal recording sheet composed of a support and a thermal recording layer formed thereon by overlapping images of plural documents using both the thermal recording and the thermal transfer recording in combination, comprising the steps of:

(a) thermally recording an image of a first document on the thermal recording sheet;

(b) arranging a thermal transfer donor sheet for thermal transfer recording on the thermal recording sheet, the thermal transfer donor sheet having a thermal transfer layer containing a desensitizer for suppressing a coloring reaction in the thermal recording layer; and (c) contacting the thermal head with the face of the thermal transfer donor sheet so that an image of a second document is recorded, by the thermal transfer recording, on the thermal recording sheet thermally recorded already.

In such a method, the following document (second document) may be recorded on the thermal recording sheet either by the thermal transfer recording only, or by using both the thermal recording and the thermal transfer recording in combination. After the first document has been thermally recorded, the following document (second document) is recorded by the thermal transfer recording once the recording sheet is returned to the original position. In this case, a scanner is used to read both the first document and the second document in this order so that respective documents can be recorded on the recording sheet, and this makes the apparatus compact.

The number of documents to be recorded on the recording sheet may be three or more. In this case, although the second document can be recorded by using both the thermal recording and the thermal transfer recording in combination, the third and the following documents is preferably recorded by the thermal transfer recording only.

Further, the image of the document and the related coloring information may be stored in a memory so that print-out is made by overlapping images of the other documents previously stored in the memory synchronously with the reading operation of the final document. Furthermore, different scanners may be used for each document, so that a is made by overlapping images read by respective scanners.

A form of an apparatus according to the present invention is the apparatus for thermal recording and thermal transfer recording in a multicolor system, in which multicolor recording is performed on a thermal recording sheet composed of a support and a thermal recording layer thereon by using both the thermal recording and the thermal transfer recording in combination, comprising (a) a thermal head opposite to the face of the thermal recording layer on the thermal recording sheet, which performs reciprocating motion within a range of a prescribed distance perpendicular to a feeding direction of the thermal recording sheet;

(b) means for arranging a thermal transfer donor sheet, where the thermal transfer donor sheet is arranged to be movable back and forth between the thermal recording sheet and the thermal head, the transfer donor sheet having thereon a thermal transfer layer to be thermally transferred by the thermal head, the thermal transfer layer containing a desensitizer for suppressing a coloring reaction on the thermal recording layer; and (c) print control means for performing the thermal recording by the thermal head in a recording region on the thermal recording sheet and for performing the thermal transfer recording in the recording region thermally recorded already by contacting said thermal head with the thermal transfer donor sheet.

The means for arranging the thermal transfer donor sheet may be a ribbon case in which the thermal transfer donor sheet (ink ribbon) is housed. The case is moved relatively to the thermal head so that the ink ribbon (thermal transfer donor sheet) can be inserted between the thermal head and the thermal recording sheet.

Another form of an apparatus according to the present invention is the apparatus for thermal recording and thermal transfer recording in a multicolor system, in which multicolor recording is performed on a thermal recording sheet composed of a support and a thermal recording layer formed thereon by using both the thermal recording and the thermal transfer recording in combination, comprising (a) a print head opposite to the face of the thermal recording layer of the thermal recording sheet, which performs reciprocating motion within a range of a prescribed distance perpendicular to a feeding direction of the thermal recording sheet;

(b) a first thermal head for thermal recording which is provided in the print head and is opposite to the face of the thermal recording layer of the thermal recording sheet;

(c) a second thermal head for thermal transfer recording which is provided in the print head and is opposite, through a thermal transfer donor sheet, to the face of the thermal recording layer on the thermal recording sheet, the thermal transfer donor sheet having thereon a thermal transfer layer to be thermally transferred by the first thermal head for thermal transfer recording, the thermal transfer layer containing a desensitizer for suppressing an coloring reaction on the thermal recording layer; and (d) print control means for performing the thermal recording on the thermal recording sheet by the first thermal head for thermal recording, and for performing the thermal transfer recording in the same recording region as thermally recorded, where the second thermal head for thermal transfer recording is overlaid on the face of the recording region, the first thermal head and the second thermal head both used in the above operation incorporated in the same print head.

The first thermal head for thermal recording and the second thermal head for thermal transfer recording may be either aligned with each other in a line along the moving direction of the print head, or staggered or dispalced in the feeding direction of the recording sheet so that they are not in line with each other. In the former case, the thermal recording and the thermal transfer recording are performed to the same recording region continuously with a prescribed time difference the one-way print head's motion, so that multicolor printing can be performed in one recording region during one-time reciprocating motion of the print head, thereby making print time short. Further, the thermal recording and the thermal transfer recording may be performed on the going way and the returning way, respectively.

In the case the thermal heads are aligned with each other in the feeding direction of the recording sheet, the thermal heads can be fed in the moving direction of the print head with the location relationship kept therebetween. It is preferable to make a difference between a color developed in the thermal recording sheet and a color printed by the thermal transfer recording in order to increase the number of colors to be printed. The color to be thermally transferred may be one or plural. For example, three primary colors, red, green and blue are used to be thermally transferred; black is used to be thermally developed on the thermal recording paper.

Still another form of an apparatus according to the present invention is the apparatus for thermal recording and thermal transfer recording in a multicolor system, in which multicolor recording is performed on a thermal recording sheet composed of a support and a thermal recording layer formed thereon by overlapping images of plural documents using both the thermal recording and the thermal transfer recording in combination, comprising (a) a memory which stores coloring information for each document;

(b) a scanner for reading each document;

(c) a first thermal head for thermal recording which is opposite to the face of the thermal recording layer of the thermal recording sheet, and which performs relatively reciprocating motion within a range of a prescribed distance perpendicular to a feeding direction of the thermal recording sheet;

(d) a second thermal head for thermal transfer recording which is opposite, through a thermal transfer donor sheet, to the face of the thermal recording layer of the thermal recording sheet, the thermal transfer donor sheet having thereon a thermal transfer layer to be thermally transferred by the second thermal head for thermal transfer recording, the thermal transfer layer containing a desensitizer for suppressing a coloring reaction in the thermal recording layer; and (e) print control means for performing the thermal recording of a first document on the thermal recording sheet by the first thermal head, and for performing the thermal transfer recording on the same recording sheet by overlapping an image of a second document using the second thermal head for thermal transfer recording.

BRIEF DESCRIPTION OF THE DRAWINGS

These and other objects and advantages and further description will now be discussed in connection with the drawings in which:

FIG. 13 is a schematic diagram showing a conception of overlap printing according to a second embodiment of the present invention;

DETAILED DESCRIPTION OF THE PREFERRED EMBODIMENTS

First Embodiment

Apparatus Configuration

Figure 1:
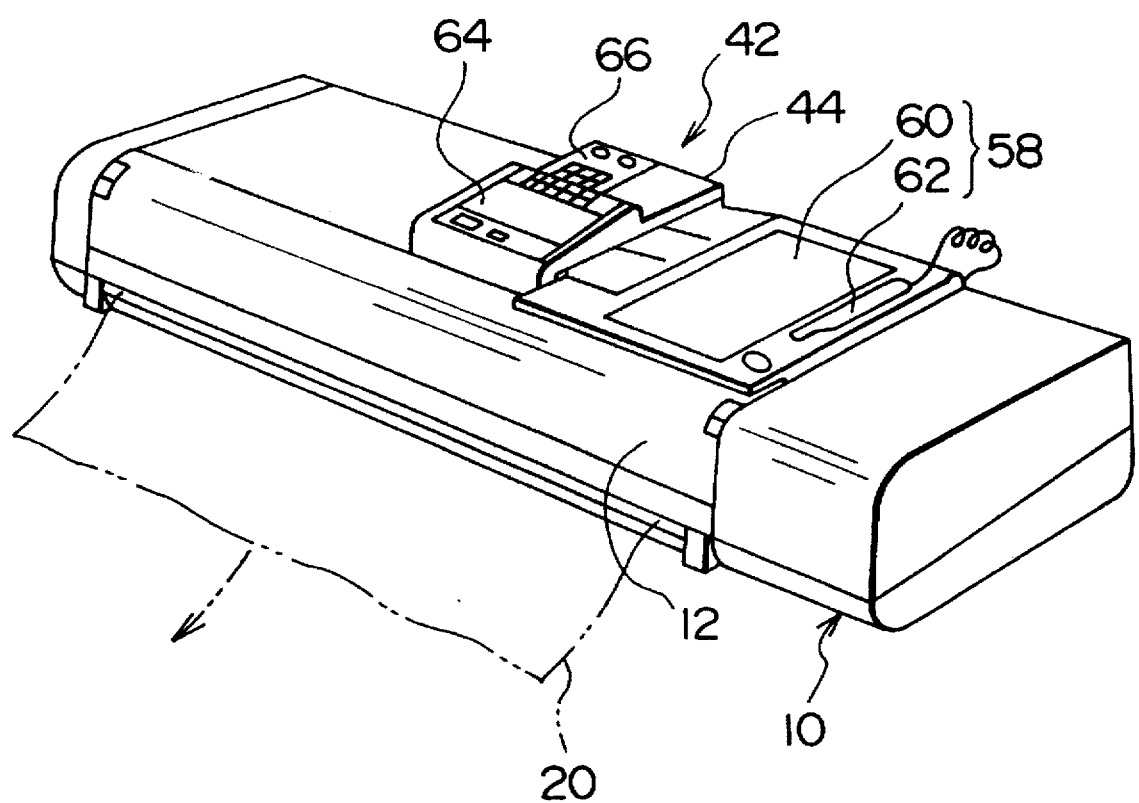
FIG. 1 is a perspective view of an image processing apparatus employing an apparatus, according to a first embodiment of the present invention, for thermal recording and thermal transfer recording in a multicolor system.

Referring to FIGS. 1 to 12, descriptions will be made with respect to the procedure for performing multicolor printing based on one document which is primary operation of the first embodiment and, then, with respect to the procedure for performing printing by overlapping images of plural documents which is targeted in a second embodiment. At first, the arrangement of elements in the image processing apparatus will be described with reference to FIGS. 1 to 4. In FIG. 1, a reference numeral 10 denotes a housing body of rectangular prism having a presser cover 12 on the upper face thereof which can be opened and closed upwardly.

Figure 2:
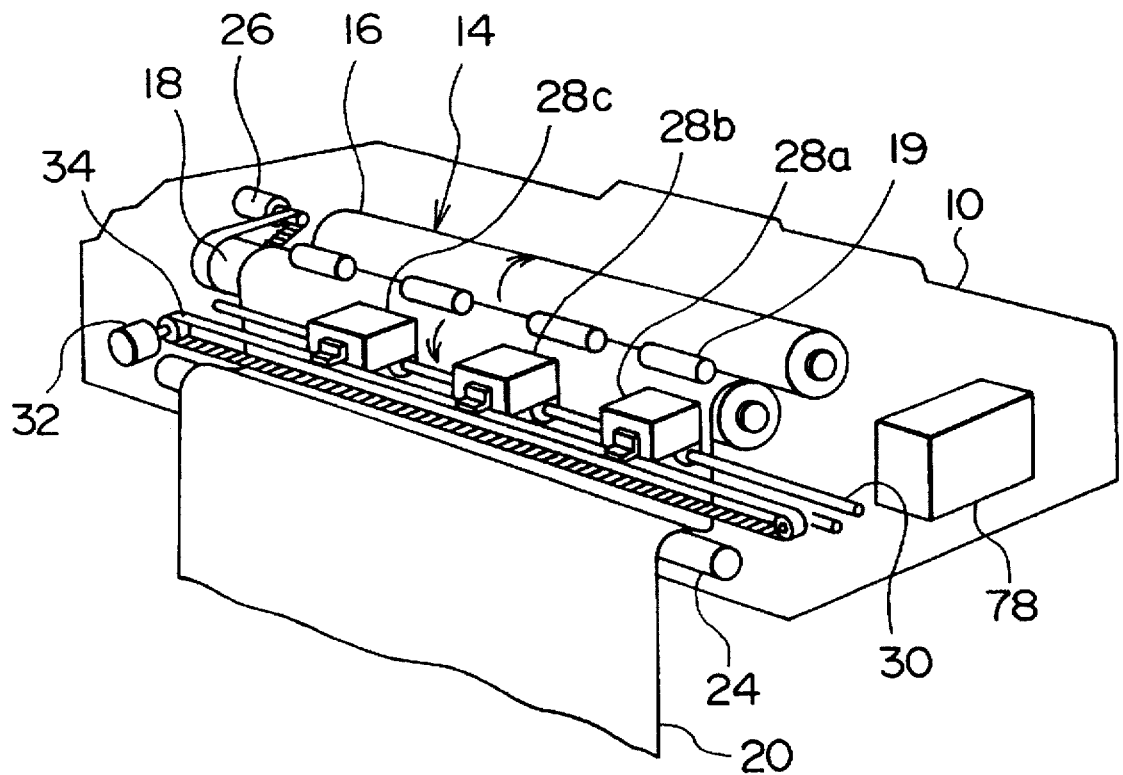
FIG. 2 is a perspective view illustrating an inner configuration of the first embodiment of FIG. 1.
Figure 3:
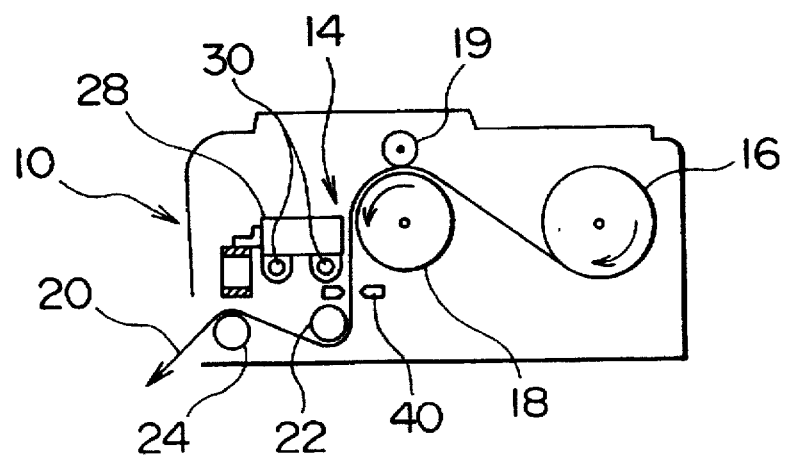
FIG. 3 is a side view illustrating the inner configuration of the first embodiment of FIG. 1.

The housing body 10 houses a printer 14 therein as shown in FIGS. 2 and 3. The printer 14 includes a paper roller 16 and a platen 18 parallel to each other and disposed on the length side of the housing body 10. The platen 18 is placed on this side of the paper roller 16. In operation, a paper 20 is pulled out from the lower edge of the paper roller 16, wound around the platen 18 and fed downward from the front edge of the platen 18. Here, a reference numeral 19 indicates a pinch roller for pressing the paper 20 onto the platen 18.

Then, guide rollers 22 and 24 are operative to eject the paper 20 from the lower side of the front face of the housing body 10. The platen 18 is actuated through a belt by a feed motor 26 to feed the paper 20 in a forward or reverse direction for placing the paper 20 in position.

The printer 14 is equipped with three print heads 28 (28a, 28b and 28c) traveling along the front face of the platen 18 in the lateral direction. The print heads 28 are guided along guide rods 30 and moved side to side on a belt 34 fastened round a carriage motor 32. Each of the print heads 28, whose type is such as used in a thermal recording/thermal transfer recording system for multicolor printing described later, is designed to move through a distance D determined by trisecting a full width 3D of printing region on the paper 20 (FIG. 4), taking its carriage return position (home position or HP) at the right end of the moving range.

Figure 4:
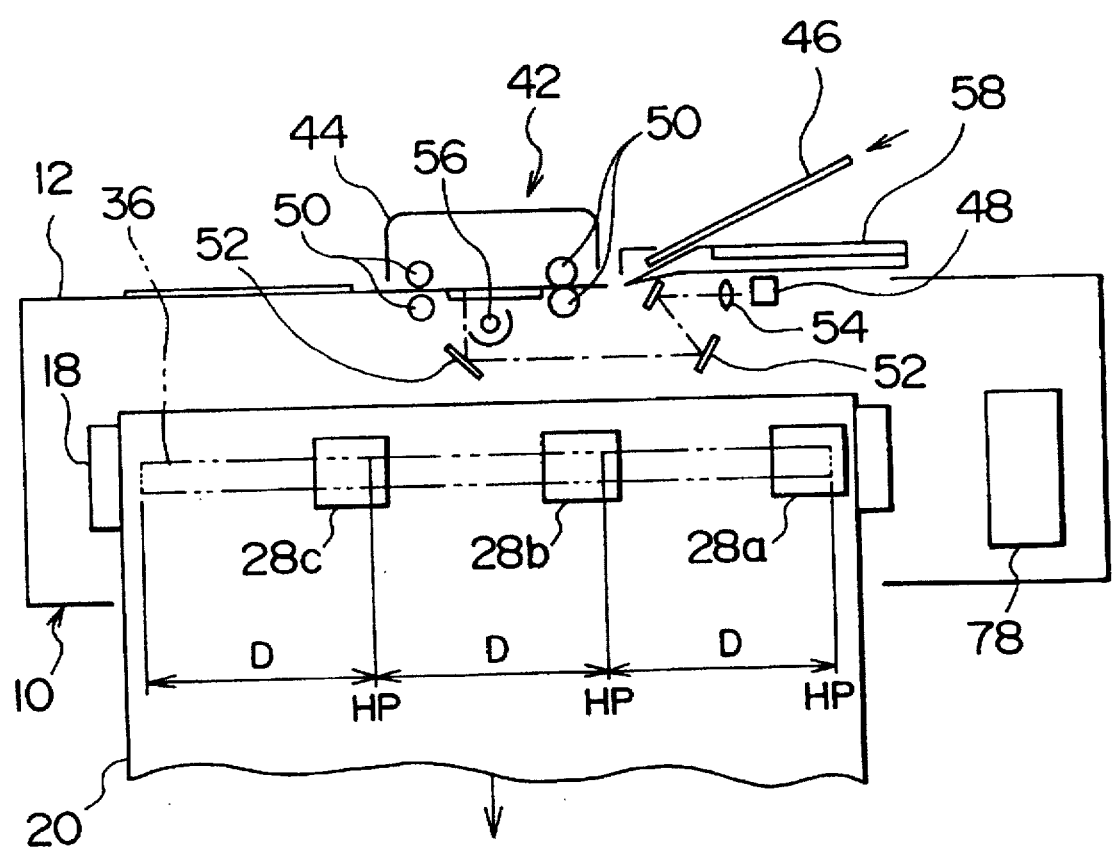
FIG. 4 is a front view illustrating the inner configuration of the first embodiment of FIG. 1.
Figure 5:
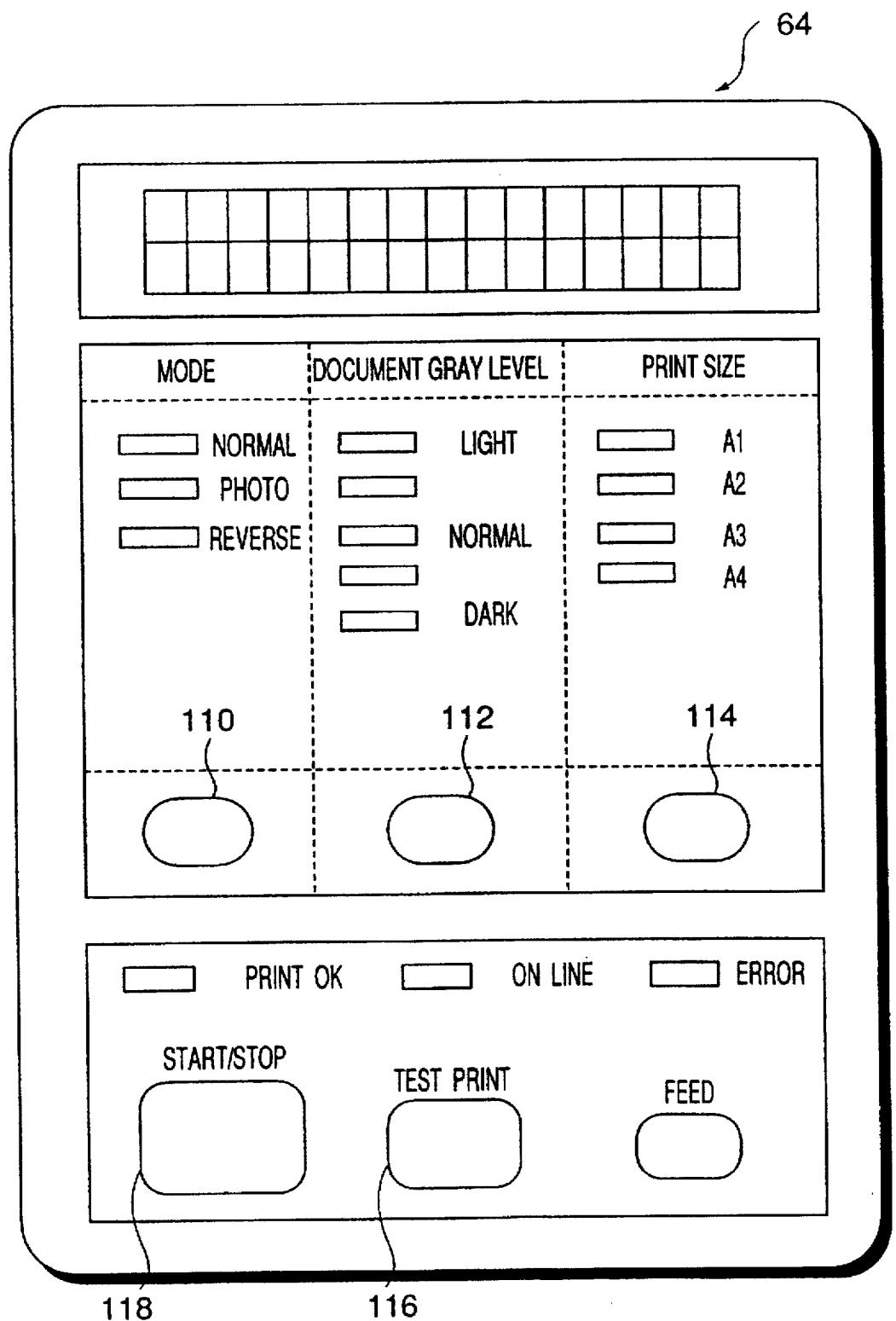
FIG. 5 is a diagram showing a printing operation panel provided on an upper face of a presser cover of a scanner.
Figure 6:
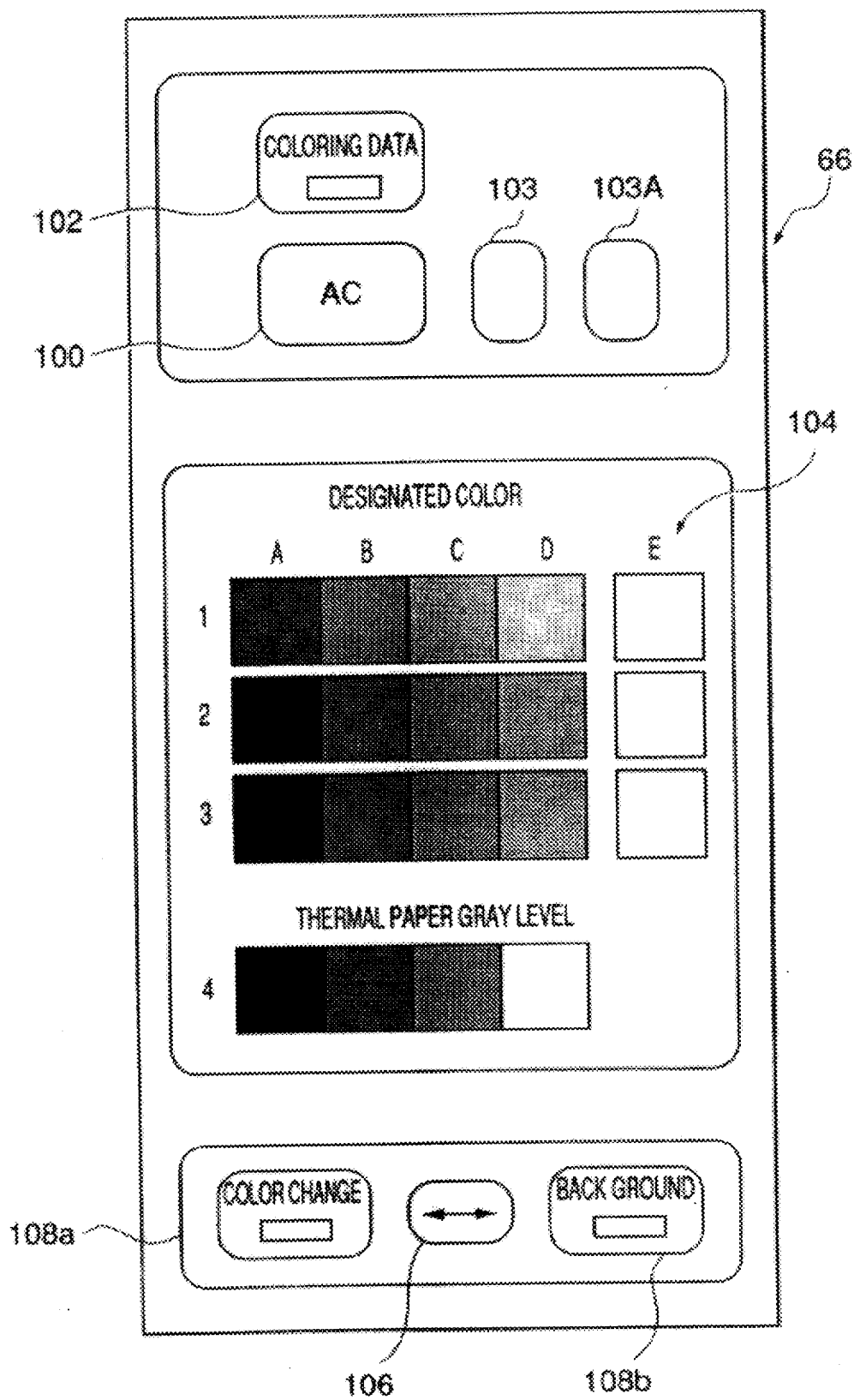
FIG. 6 is a diagram showing a coloring operation panel provided on the upper face of the presser cover of the scanner.

The paper 20 to be used for the printer 14 is a thermal recording sheet (i.e., heat-sensitive paper or thermosensible paper) such as thermally prints black on a white sheet. The print heads 28 each include one or more ink ribbon having color(s) different from that thermally printed on the paper 20, and a thermal head. This construction is described later. In FIG. 4, a reference numeral 36 indicates a printing region (recording region) for the print heads 28.

In FIG. 3, a reference numeral 40 is a cutter located below the platen 18 for cutting off the print paper 20. The cutter 40 has fixed and moving blades opposite to each other through the paper 20, in which the moving blade is actuated by a motor to move toward the fixed blade, thus cutting off the paper 20.

Then, a reference numeral 42 denotes a scanner provided near the center of the upper face of the top cover 12. The scanner 42, as shown in FIG. 4, includes a presser plate 44 put on the cover 12 from the upside for pressing the document to be scanned; a carrier mechanism for lateral feed of a document 46 put between the presser plate 44 and the cover 12 of the housing body 10; a CCD line sensor 48 held in the housing body 10; and an optical system for transmitting, to the line sensor 48, an image of a main scanning line intersecting perpendicularly to a traveling direction of the document 46.

The carrier mechanism is constituted of four feed rollers 50 putting the document 46 therebetween from the upper and lower sides for lateral feed of the document 46, two rollers 50 on the housing 10 side rotated by a motor (not shown). The optical system is constituted of mirrors 52 arranged in proper numbers and a lens 54. Here, a reference numeral 56 indicates a light source.

Next, indicated by a reference numeral 58 is a digitizer provided on the feeding side of the document 46 from which the document 46 is put on the scanner 42, i.e., on the upper face of the cover 12 near the right side of the scanner 42. The digitizer 58, as shown in FIG. 1, includes a tablet 60 for coordinates detection and stylus pen 62. The tablet 60 has the whole surface of which is covered with a resistive material and detects coordinates from resistance changes thereon due to a force by the tip of the stylus pen 62. The tablet 60 generally has a reference position, for example, at the right corner so that the document 46 can be placed in its correct position by setting it to the reference position.

Reference numerals 64, 66 indicate a printing operation panel and a coloring operation or color edition panel, respectively, attached to the upper face of the presser plate 44 of the scanner 42 in a manner that the coloring operation panel 66 is arranged on the back side of the upper face of the presser plate 44 and the printing operation panel 64 is arranged on this side of the coloring operation panel 66. Operation of these operation panels 64, 66 are described later.

Figure 7:
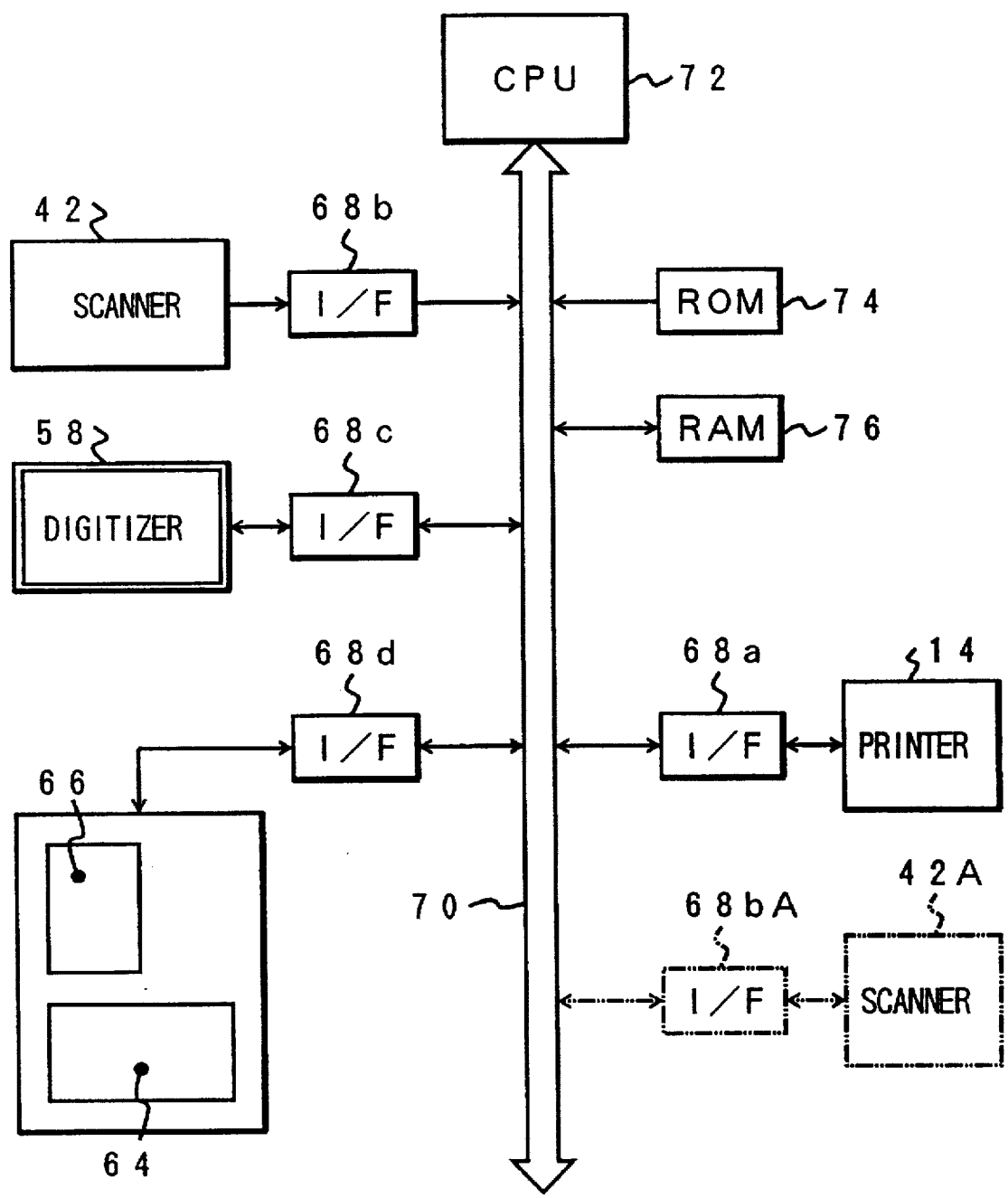
FIG. 7 is a block diagram illustrating a control system according to the first embodiment.

The printer 14, scanner 42, digitizer 58 and operation panels 64, 66 are connected to a bus 70 through respective interface 68a to 68d (FIG. 7).

All such as CPU 72, ROM 74, RAM 76 are also connected to the bus 70. The ROM 74 stores an operating program for CPU 72 and all kinds of constants needed for computing processes. The CPU 72 runs under the operating program and constitutes a controller 78 (FIGS. 2 and 4) commonly used for control of the printer 14. The controller 78 executes control processing according to operational flowchart of FIG. 8 during the time of operating the image processing apparatus, but it executes control processing according to the operational flowchart of FIG. 12 in printing operation.

Editing Operation in Coloring

Figure 8:
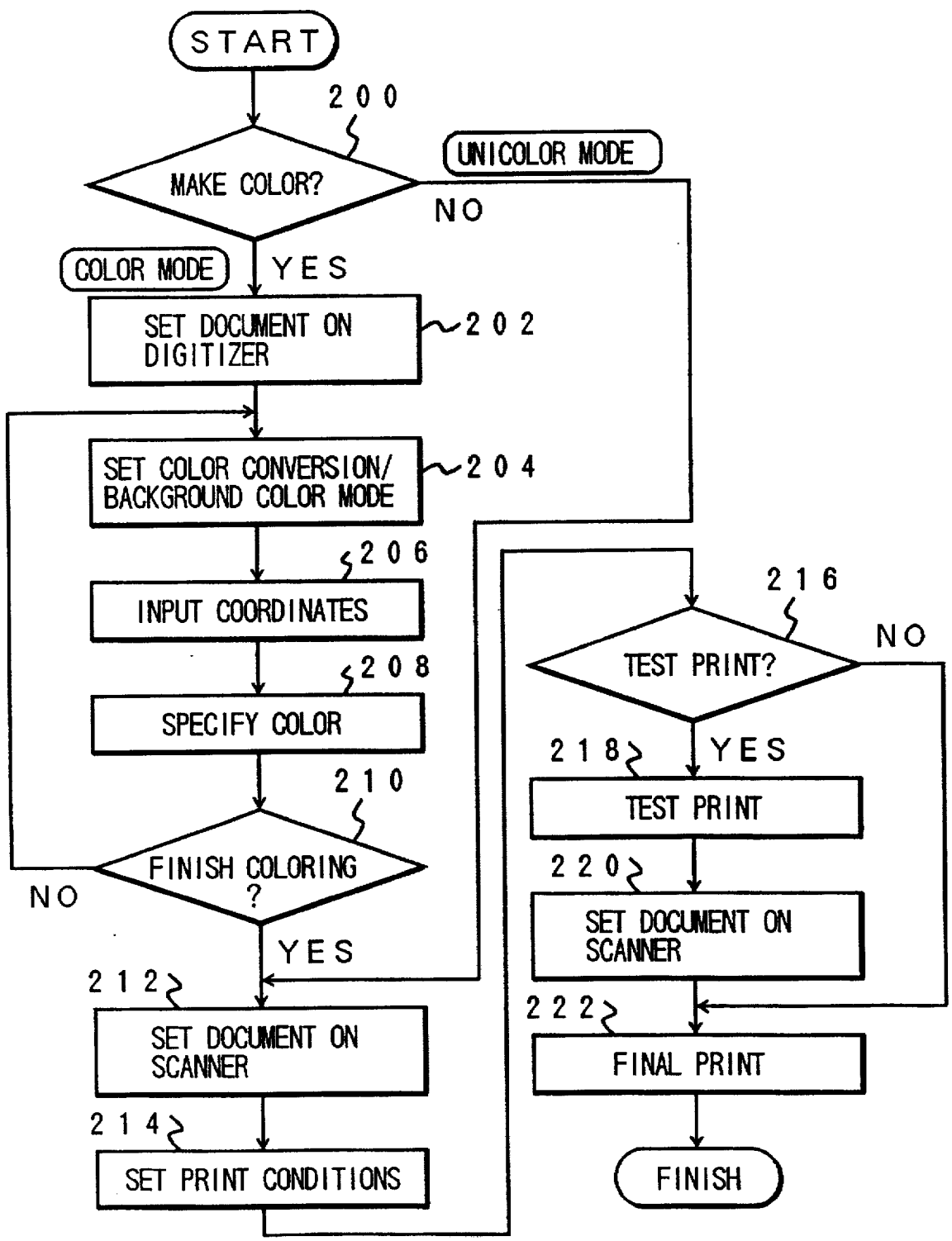
FIG. 8 is a flowchart showing typical coloring processing steps.

Referring next to FIG. 8, editing operation in coloring according to this embodiment will be described. When coloring data used in the past remains, a coloring data indication LED 102 (FIG. 6) must be turned on. If the LED 102 is being lit, an all clear key 100 on the operation panel 66 has to be pushed at first so that the old coloring data can be canceled. Where there is no need to perform printing with different colors, that is, when performing unicolor printing in an unicolor mode (step 200), the document 46 is set on the scanner 42 (step 212 and printed out without any other operation of the operation panel 66.

The printer 14 according to the present invention combines thermal recording by the thermal recording sheet and thermal transfer recording by the ink ribbons. For this reason, the operation panel 66 arranges key groups for thermal transfer recording (1, 2, 3) and a key group (4) for gray level or color density adjustment on the thermal paper individually in an area for color designation key group 104. Accordingly, a proper gray level is selected out of keys A to D in the key group (4) when coloring is performed with thermal recording; a proper color density is selected out of keys A to E in the key groups (1, 2, 3) when coloring is performed with thermal transfer recording. The key groups (1, 2, 3) are respectively assigned to red, green and blue, for example, so as to correspond to colors on the ink ribbon to be set to the print head 28 described later.

If coloring is performed with different colors (step 200), the document 46 is set on the digitizer 58 (step 202). In detail, the document 46 is put on the tablet 60 with the paper face directed to the upside and with the right corner set to the reference position (top right corner) of the tablet 60. Next, either a color conversion (color change) mode or a background color mode is selected for determination of the coloring process (step 204). This mode selection is executed by a switch key 106. As the switch key 106 is pushed, LEDs 108a, 108b respectively indicating the color conversion mode and the background color mode are turned on alternately so that the mode selected can be seen. The color conversion mode is selected for converting a color of an image (black portion on the document) input with its coordinates; and the background mode is selected for inputting a color in a background area (white portion on the document) input with its coordinates.

Next, the coordinates in the coloring area is inputted with the digitizer 58 (step 206). For example, if the image is to be colored (in color conversion mode), an area in which the image to be colored is contained is specified. The area is determined, if the area is a square, by specifying two points diagonal to each other. The area may be specified as a polygon by linking several points with a line. In case of background painting, the background area is specified in the same manner.

After inputting the coordinates such above, the color designation for the portion to be colored is made by selecting a key from the key group 104 (step 208). Then, the operation of processing steps 204 to 208 is repeated until the desired coloring is obtained, and all the images and portions to be colored are thus edited (step 210). The resulting data is stored in the RAM 76 or the like. That is, stored in the memory is data (coloring information) of the coordinates and colors. Subsequent steps after end operation of the color-editing (step 210) enter in a process of printing.

In printing, the document 46 is set on the scanner 42 (step 212), and printing conditions are then set with the operation panel 64 (step 214). That is, an output mode is selected out of a normal mode, a photograph mode and a reverse mode by pushing a key 110; a gray level or color density of the document is set pushing a key 112; and a print size is set pushing a key 114. If test print reflecting the settings such above is required before final printing, a test print key 116 is pushed (step 216).

Subsequently, the scanner 42 starts reading an image of the document 46 and printing it with a smaller image size (e.g., A7 size) than that in the final print (step 218). This printing operation executes coloring based on the coloring data currently stored in the memory synchronously with reading of the image. That is, in such operation, the printer 14 is linked to the scanner 42 for printing the image read by the scanner 42.

As a result of the test print with a smaller size, if the coloring data needs collecting, the coloring is again edited to a portion or portions to be corrected. In final printing, the document 46 is again set on the scanner 42 (step 220), and a start/stop key 118 is pushed. Then, the coloring processing is performed simultaneously with the document 46 read by the scanner 42, and the final print is printed out (step 222). As such above, the document 46 is read by the scanner 42 and output to the printer 14 in parallel, so that the storage capacity for the image memory can be reduced.

Printer

Next, a description will be made with respect to the printer 14 for performing thermal recording and thermal transfer recording in multicolor printing. The printer 14 uses not only a print paper 20 as a thermal paper but also thermal transfer ink ribbons with which a thermally transferred image is overlaid on the print paper 20. Three print heads 28 have respective thermal heads 150 (see FIGS. 9A and 9B) and three ribbon cases 152 (152a, 152b)(see FIGS. 10A and 10B). The ink ribbon 154 (thermal transfer recording donor sheet) incorporated into each of the ribbon cases 152 has a color individually corresponding to the color assigned to the key 1, 2 or 3 of the color designation key group on the coloring operation panel 66, i.e., red, green or blue in this embodiment.

Figure 10A:
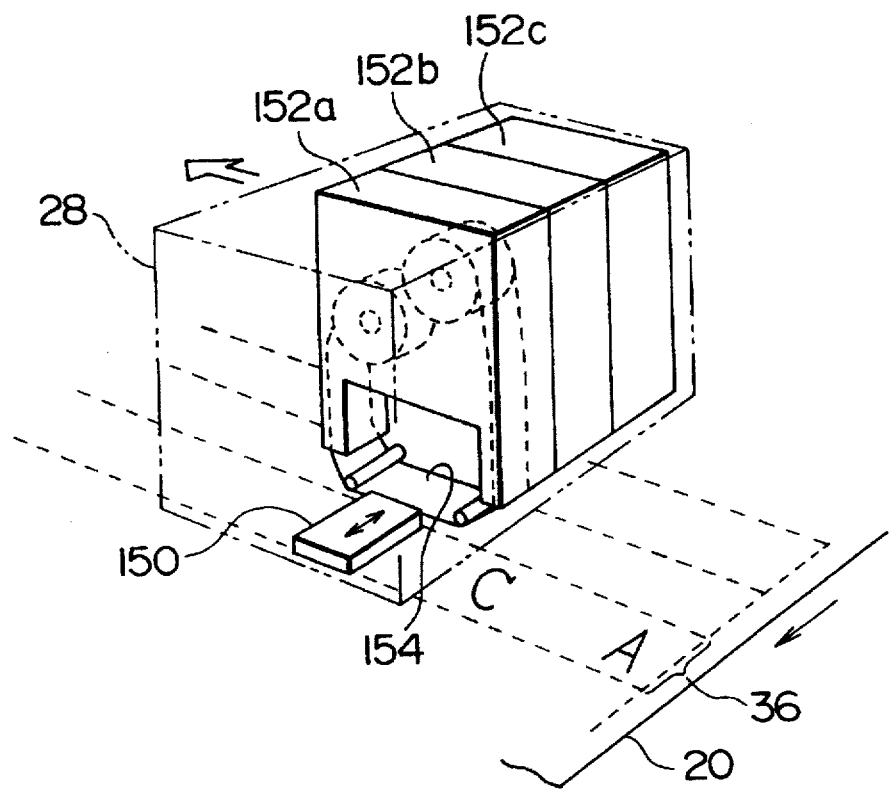
FIGS. 10A and 10B are descriptive diagrams showing operation of the print head according to the first embodiment of the present invention.
Figure 10B:
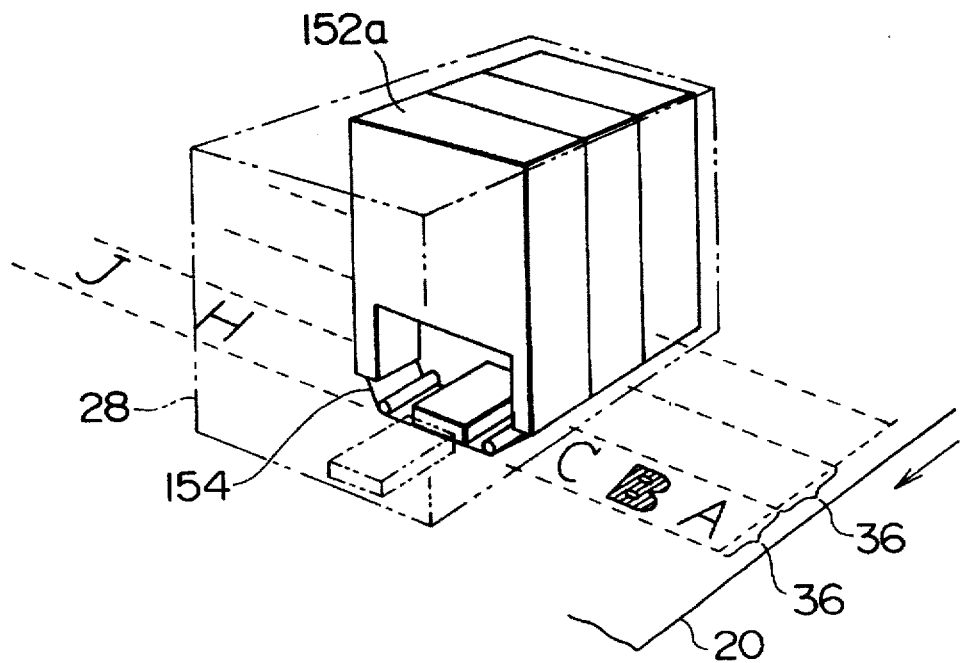

The ribbon cases 152, as shown in FIGS. 10A and 10B, are movable relatively to the thermal head 150. FIG. 10A shows a state that no ribbon 154 is put in a space between the thermal head 150 and the paper 20; FIG. 10B shows a state that a ribbon 154 in the ribbon case 152a is inserted between the thermal head 150 and the paper 20. Similarly, the ribbons 154 in the ribbon cases 152b, 152c can be selectively inserted between the thermal head 150 and the paper 20.

Figure 11A:
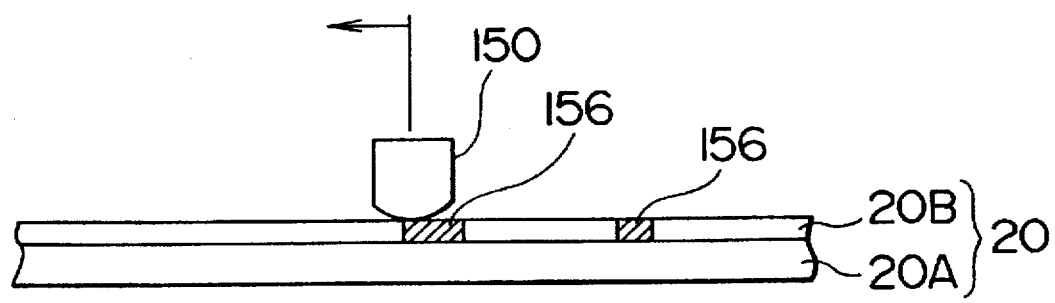
FIGS. 11A and 11B are descriptive diagrams showing a printing principle of the present invention.

The paper 20 is a thermal paper, which is also referred to a heat-sensitive paper or thermosensible paper), composed of a support 20A and a thermal recording layer 20B, as shown in FIG. 11A. The thermal recording layer 20B contains leuco dye and developer therefor. On the other hand, the ink ribbon (thermal transfer donor sheet) 154 is composed of a support 154A and a thermal transfer layer 154B. The thermal transfer layer 154B contains either or both of color dye and pigment for thermal transfer recording (printing). The thermal transfer sheet 154B further contains a desensitizer for controlling or suppressing a coloring reaction between the leuco dye and the developer in the thermal recording layer 20.

The leuco dye, developer, desensitizing substance, and color dye (pigment) which are used herein may be selected from the relevant substances which are described specifically in Japanese Patent Application No. 05-264,997, which has been published as JP-A-07-117,347 (KOKAI).

As concrete examples of the color dye and the color pigment which are used in the thermal transfer layer 154B, various species of pigments including red type pigments such as monoazo type pigment, disazo type pigment, rhodamine type pigment, perylene type pigment, quinacridon type pigment, cadmium red, and red oxide; blue type pigments such as copper phthalocyanine type pigment, triallyl methane type pigment, cobalt blue, and ultramarine blue; and yellow type pigments such as benzidine type pigment, monoazo type pigment, disazo type pigment, titanium yellow, and chrome yellow; and various species of dyes including red type dyes such as monoazo type dye, disazo type dye, rhodamine type dye, and rose bengal type dye; blue type dyes such as disazo type dye and triallyl methane type dye; and yellow type dyes such as disazo type dye and triallyl methane type dye may be cited.

As concrete examples of the desensitizing substance to be used in the thermal transfer layer 154B, esters such as trioctyl phosphate, triphenyl phosphate, tricresyl phosphate, dioctyl adipate, dibutyl sebacate, dioctyl phthalate, dicyclohexyl phthalate, tributyl trimellitate, sorbitan fatty ester, and polyoxy alkylene fatty ester; alcohols such as oleyl alcohol, tridecyl alcohol, and benzyl alcohol; ketones such as acetophenone, methyl cyclohexanone, and phorone; ethers such as polyalkylene glycol, polyoxyalkylene alkyl amine, polyoxyalkylene oleyl ether, polyoxyalkylene alkyl ether, polyoxyalkylene alkenyl ether, and polyoxyalkylene alkylphenol ether; and organic bases such as monoalkyl amine, dialkyl amine, trialkyl amine, triphenyl guanidine, dicyclohexyl guanidine, 2-benzyl imidazole, 2-phenyl-4-methyl imidazole, 2-undecyl imidazoline, 2,4,5-trifuryl-2-imidazoline, and N,N'-dibenzyl piperazine may be cited. These desensitizing substances may be used either singly or in the form of a mixture of two or more members. All the other substances that are known as desensitizers for pressure sensitizing recording papers are also available.

The thermal transfer layer 154B of this invention is allowed to add waxes and/or resins besides the aforementioned two components, i.e. the desensitizing substance and the color dye (and/or the color pigment). It is further permitted, when necessary, to add antioxidant, ultraviolet absorbent, pigment, slip additive, and various auxiliary agents. The thermal transfer layer 154B is formed by mixing these components and preparing a hotmelt or a solvent type solution and applying the hotmelt or the solution to a supporting member 154A made of paper, synthetic paper, or synthetic resin film by means of a coating device or a printing device. The ratio of the desensitizer to the total thermal transfer layer 154B is in the range of 10 to 90%, preferably 30 to 75%. The amount of the thermal transfer layer to be applied is in the range of 1 to 10 $g/m^2$, preferably 2.5 to 5.5 $g/m^2$, as a solids content.

As concrete examples of the wax to be used for the formation of the thermal transfer layer 154B, animal waxes such as beeswax; plant waxes such as carnauba wax; mineral waxes such as montan wax; petroleum waxes such as paraffin wax and microcrystalline wax; modified waxes such as paraffin wax derivatives; hydrogenated waxes such as castor wax; synthetic waxes such as distearyl ketone; fatty acid amide type waxes such as stearic acid amide; fatty acid type waxes such as stearic acid; alcohol type waxes such as stearyl alcohol; and phosphoric ester type waxes such as distearyl phosphoric esters may be cited.

The resins which are usable herein include natural resins such as rosin, shellac, copal, gilsonite, and zein, hardened rosin, ester gum, and other rosin esters, semisynthetic resins such as maleic acid resin, fumaric acid resin, dimerized rosin, polymer rosin, rosin-modified phenol resin, methyl cellulose, ethyl cellulose, hydroxyethyl cellulose, hydroxypropyl cellulose, cellulose acetate propionate, cellulose acetate butylate, and nitrocellulose, and phenol resin, xylene resin, urea resin, melamine resin, ketone resin, cumarone-indene resin, petroleum resin, terpene resin, cyclized rubber, chlorinated rubber, alkyd resin, polyamide resin, acrylic resin, polyvinyl chloride, vinyl chloride-vinyl acetate copolymer, and polyvinyl acetate.

When the thermal head 150 is put into contact with the face of the thermal recording layer 20B on the paper 20, the color is developed (thermal color-development) due to a reaction between the leuco dye and the developer in the thermal recording layer 20B. In the embodiment, the color to be developed is black. In FIG. 11A, a reference numeral 156 exhibits a color developed portion. The thermal head 150 is heated in a prescribed coordinate position, and this makes it possible to develop an image in black color only in the prescribed coordinate position.

Figure 11B:
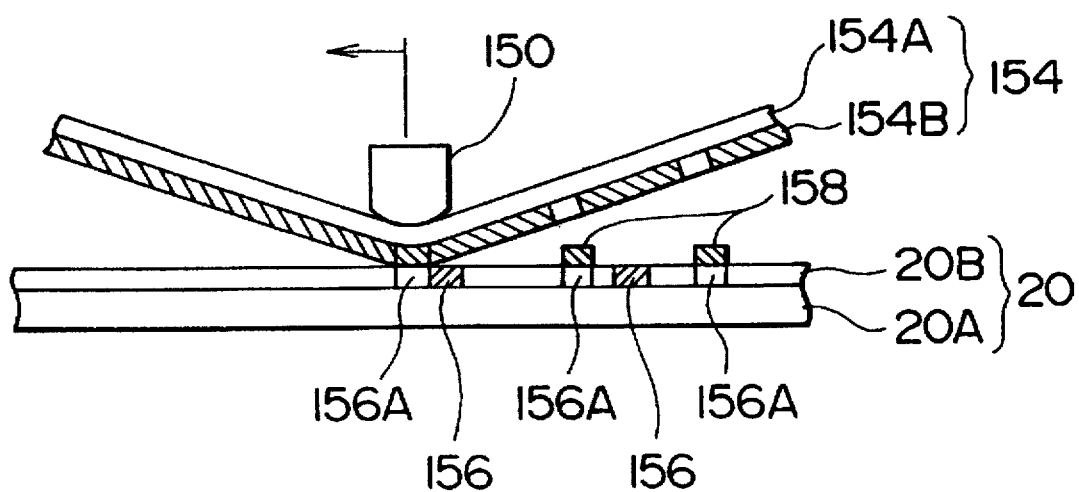
Figure 12:
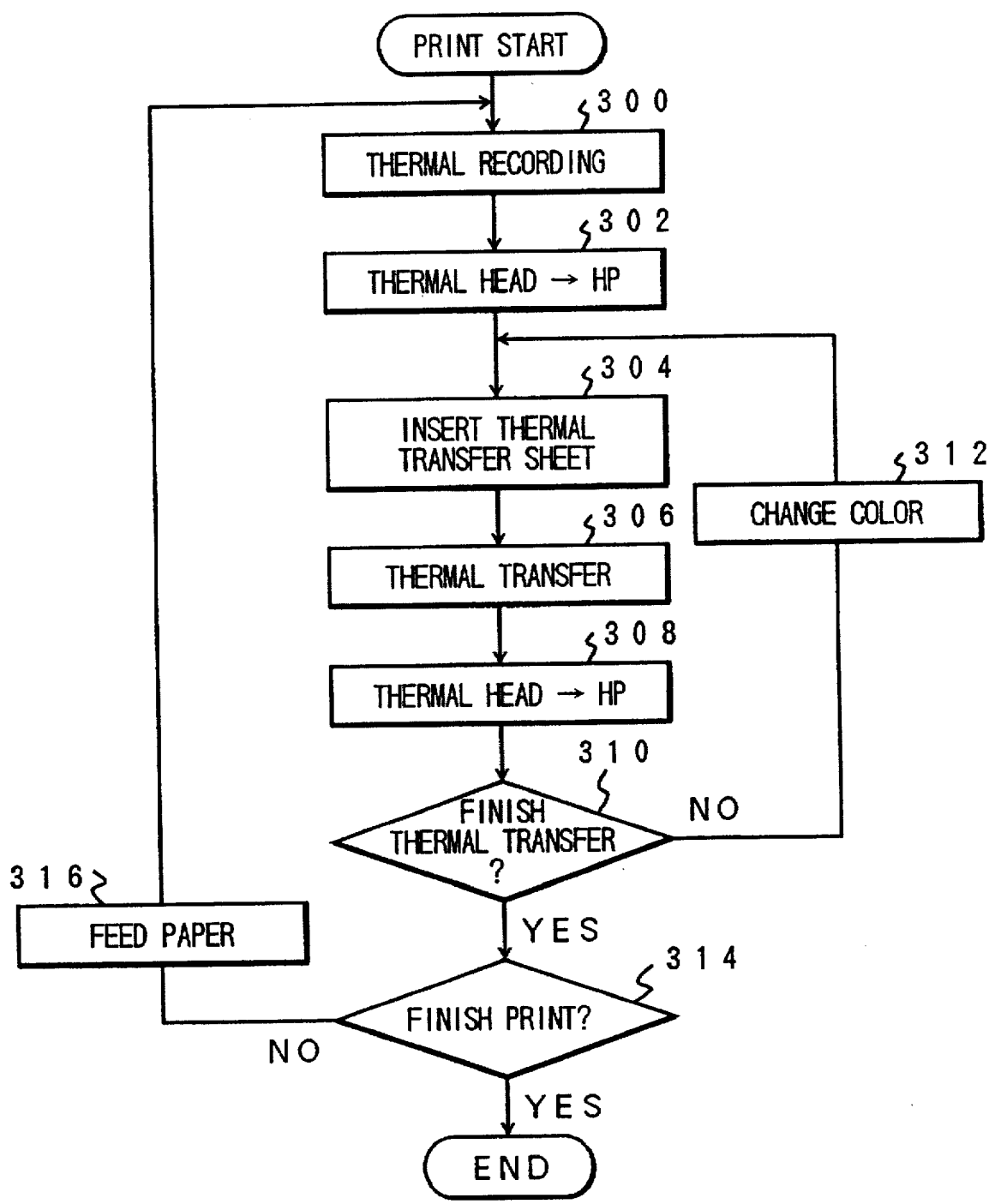
FIG. 12 is a flowchart showing operation of a printer according to the first embodiment of the present invention.

Then, the paper 20 thermally developed is heated by the thermal head 150 through the ink ribbon 154 put between the thermal head 150 and the paper 20, so that coloring by the thermal transfer is performed as shown in FIG. 11B. That is, the color dye (or pigment) contained in the thermal transfer layer 154B is transferred onto the paper surface 20 while the desensitizer of the thermal transfer layer 154B inhibits the color development on the thermal recording layer 20B.

The color development on the thermal recording layer 20B is inhibited by the desensitizer, so that the color of the color dye (pigment) transferred from the thermal transfer layer 154B is not mixed with the color which has already been developed on the thermal recording layer 20B, thereby obtaining a bright and clear print. In FIG. 11B, a reference numeral 156A exhibits a portion on the thermal recording layer 20B in which the color development was inhibited by the desensitizer; a reference numeral 158 exhibits a portion in which the color dye (pigment) is transferred from the ink ribbon 154 onto the thermal recording layer 20B.

Operation of Printer

Figure 9A:
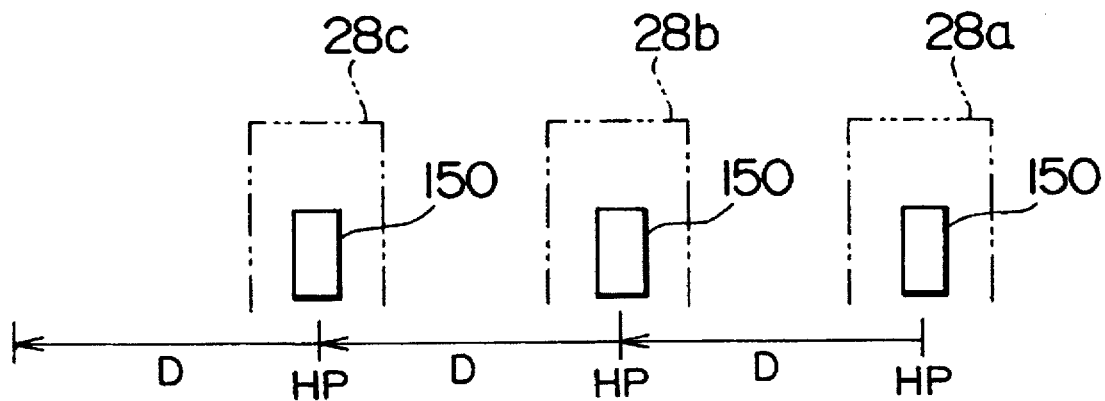
FIGS. 9A and 9B are descriptive diagrams showing a typical arrangement of print heads according to the first embodiment of the present invention.
Figure 9B:
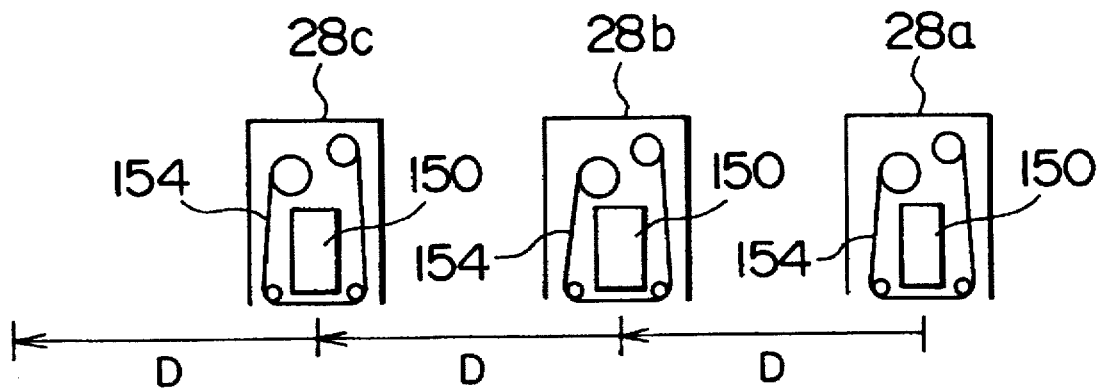

The present invention is to provide a method for performing thermal color development and thermal transfer by using one thermal head 150. In this method, three print heads 28 are initially placed in respective home positions HP and, when performing the thermal recording, the thermal head 150 is put in contact with the paper face 20 as shown in FIG. 11A (step 300 in FIG. 12). FIG. 9A shows that each print head 28 has a moving range D in the above case. One-time recording operation of the thermal head 150 results in the thermal recording on the paper 20 by a width of the thermal head 150 (the width taken along the feeding direction of the paper 20; approximately 22 mm).

The thermal head 150 (together with the print head 28) returns to the home position HP (step 302), and then the thermal transfer recording is performed on the paper 20 in the same printing region 36 (see FIG. 4). In the thermal transfer recording, the ribbon 154 in the ribbon case 152a is first inserted between the thermal head 150 and the paper 20 (step 304), and then the thermal head 150 is moved to and heated in a prescribed coordinate position so that the thermal transfer can be performed (step 306). Subsequently, the thermal head 150 returns to the home position HP, and the ink ribbon 154 to be used for the thermal transfer is changed for a different colored one (steps 310, 312). Thus, the same operation is repeated for the other two colors. In FIG. 10B, A, C, H and J are letters thermally recorded; B is a letter thermally transferred.

The above operation is repeated in continuous recording regions 36 while feeding the paper 20 intermittently (steps 314, 316). After end operation of printing of all the recording regions 36, the paper 20 is fed by a prescribed amount and cut out by the cutter 40.

In thermal transfer recording, the color dye (pigment) and waxes contained in the thermal transfer layer 154B are transferred on the paper 20 and, when the thermal color development is performed by contacting the thermal head 150 with the paper face 20 after the thermal transfer recording, the color dye (pigment) and waxes adhere to the thermal head 150, so that a clear print can not be obtained. Taking this problem into consideration, according to the present invention, the thermal recording is performed prior to the thermal transfer recording. Accordingly, multicolor printing by one thermal head 150 is possible.

In the embodiment, although the three ink ribbons 154 having respective three colors are used as thermal transfer donor sheets, one ink ribbon can be used instead of three (full-color system), in which different color portions, such as for yellow, magenta, cyan, and black are formed on the ink ribbon at an equal distance in order. The present invention is not limited to the three ink ribbons 154 provided for three colors, three or more ink ribbons may be used for three colors or more, or for two colors or less, e.g., one color.

Further, the support 20A of the paper 20 may be colored previously so that different colors are developed and transferred through the thermal recording and the thermal transfer recording, respectively, and this makes it possible to further increase the number of usable colors in printing. Furthermore, a replaceable ribbon case may be used instead of the ribbon case 152 unitarily incorporated in the print head 20, which is removed from the print head in the home position and replaced with another one (stocker system).

As such above, the embodiment describes that, after performing the thermal recording on the thermal recording sheet, the thermal transfer recording is performed, by the thermal head commonly used for both recording systems, on the thermal transfer donor sheet containing the desensitizer operative to suppress the coloring reaction between the leuco dye and the developer. Accordingly, no color mixture occurs between a portion thermally developed and a portion printed through the thermal transfer, so that bright and clear multi-color printing can be performed.

The color development is made first with the thermal recording prior to the thermal transfer recording. Therefore, the color dye (pigment) and waxes transferred onto the paper in the thermal transfer recording does not adhere to the thermal head, and so that clear prints can be obtained at all times. This makes it possible to perform the printing operation with one thermal head, resulting in a simple printer configuration.

Second Embodiment

Overlap Printing

The aforementioned embodiment is to perform the final printing after one document to be colored is processed and the test printing is performed as required. Using this apparatus, a description will be made next with respect to a method and an apparatus for performing printing on one recording sheet with different documents overlapping. In this case, an overlap printing selection key 103 (FIG. 6) on the coloring operation panel 66 is pushed at first to start overlap recording operation.

Figure 14:
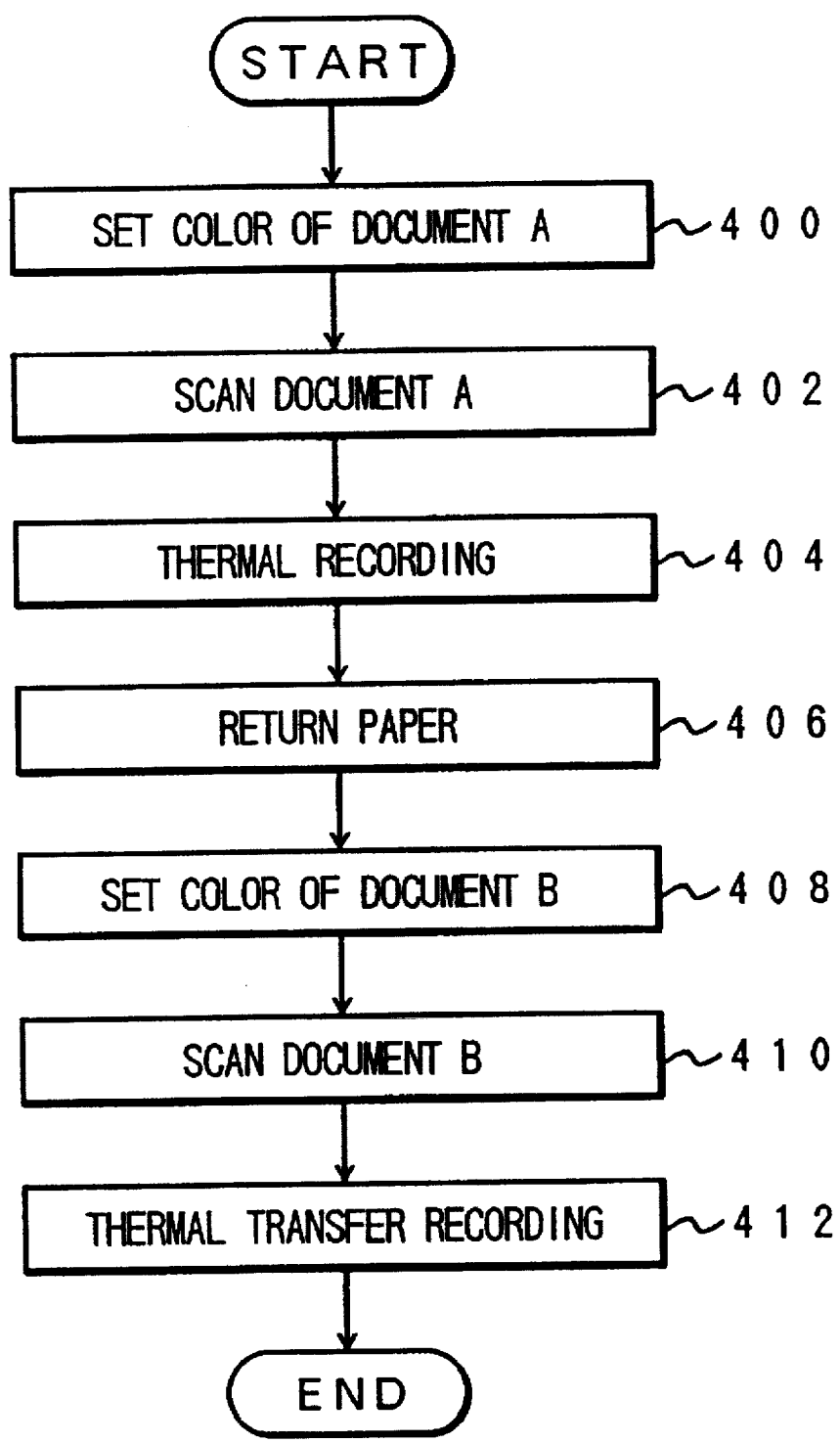
FIG. 14 is a flowchart showing operation of the second embodiment of the present invention.

FIG. 13 is a conceptual diagram showing the overlap printing operation; FIG. 14 is an operational flowchart showing an example of the operation in FIG. 13. In this embodiment, an image of a first document is printed through the thermal recording and images of second and the following documents are printed by either or both of the thermal recording and the thermal transfer recording. For example, printing operation for obtaining a synthesized image in FIG. 13 is as follows: a caption on a document B in FIG. 13 is overlapped with a landscape on a document A in the same drawing using the landscape as a background.

In the embodiment, the background on the document A is set to be printed with a monochrome color (step 400 in FIG. 14) and the coloring information is stored in the RAM 76 (FIG. 7). Then, the document A is set on the scanner 42 and the image thereon is read out (step 402). The image read by the scanner is output through the thermal recording to the printer 14 synchronously with image reading (step 404).

After the end operation of the first document A, the recording sheet 20 is returned to the original position (step 406). Then, color setting is made for the second document B (step 408) after a next page key 103A (not shown) on the coloring operation panel 66 has been pushed. The color is set either for the thermal recording and the thermal transfer recording, or for the thermal transfer recording only. Thus, the thermal recording and/or the thermal transfer recording are performed on the recording sheet 20 (step 412) while reading the document B using the scanner 42 (step 410).

It should be noted that there is no inconvenience even if the thermal recording region on the document B overlaps with the thermal recording region on the document A because both regions are printed with the same color. In case the thermal transfer recording region on the document B overlaps with the thermal recording region on the document A, the thermally colored image overlapped is eliminated due to an action by the desensitizer contained in the ink ribbon, so that the color printed through the thermal transfer is made bright without color mixture.

When the number of the documents to be overlapped is three or more, the processing steps 406 to 412 have only to be repeated for the third and the following documents. In this case, if thermal transfer recording regions are overlapped, the colors may be mixed with each other, so that it is preferable to set the colors such that no overlap occurs. Further, the document A used for the thermal recording may be plural. In this case, the processing steps 400 to 404 have only to be repeated for each document A after returning the recording sheet 20 each time. This repeated operation is essentially the same as the operation for repeating the processing steps 406 to 412.

In the embodiment, the document is printed out synchronously with the reading by the scanner, and plural images of the documents are overlapped with the recording sheet returned to the original position for each document. In this case, the documents to be overlapped need to be set on the scanner plural times, and the scanner is somewhat troublesome to operate, but it is nevertheless suitable for reducing the number of parts and making the cost low because of its simple apparatus configuration.

Third Embodiment

Figure 15:
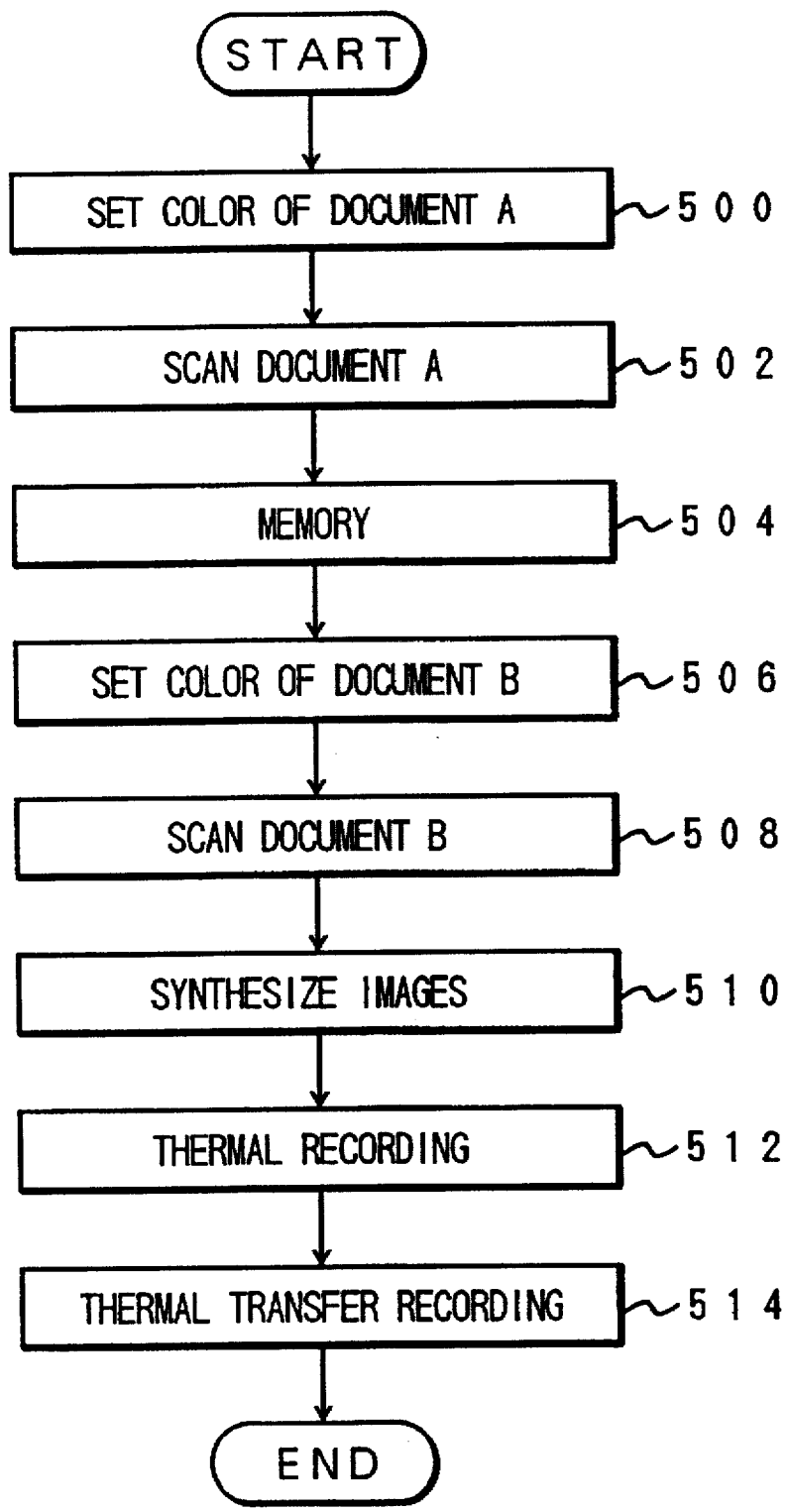
FIG. 15 is a flowchart showing operation of a third embodiment of the present invention.

FIG. 15 is a flowchart showing operation of overlap printing according to the third embodiment. In this embodiment, an image of the first document and the related coloring information are previously stored, e.g., in the RAM 76 and the stored data is synthesized with the following image synchronously with reading of the following document, so that the thermal recording and the following thermal transfer recording are performed and printed out by overlapping each other.

In operation, an overlap printing key 103 is first pushed so that the first document A is set to a color for thermal recording (step 500). Then, the image of the first document A is read by the scanner 42 (step 502) and stored in the RAM 76 together with its coloring information (step 504). Next, color setting is made for the second document B after the next page key 103A has been pushed (step 506) and document B is read by the scanner (step 506). The image synthesis is performed in the computer or CPU 72 by reading out the image information of the document A from the RAM 76 synchronously with the reading of the document B (step 510). The image synthesis is thus performed synchronously with the image reading by the scanner 42. The thermal recording is performed by the printer 14 simultaneously with the image synthesis (step 512), and the thermal transfer recording is performed after the thermal recording (step 514).

In the embodiment, the RAM 76 having a large storage capacity is used to store the image of the first document and the related coloring information, so that plural documents are synthesized with each other and the synthesized image is printed out at the same time while reading other documents by the scanner. In this case, even if some thermal transfer recording regions are overlapped with each other, color mixture between the overlapped portions can be prevented by setting priorities between documents to be printed by the thermal transfer recording.

The printer 14 used in the embodiment performs multi-color printing in a printing region 36 on the recording sheet 20 and then moves to the next printing region 36 for the next printing operation. It is also possible to record, by the thermal transfer recording, the whole image to be printed out when the recording sheet 20 is returned to the original position after recording the whole image by the thermal recording. Further, the thermal transfer recording can be performed for each color by rewinding the recording sheet 20 to the original printing position as the ink ribbon is changed to another ribbon having different color. In this case, it is necessary to reset the documents A, B onto the scanner in each recording operation as a matter of course.

Fourth Embodiment

Figure 16:
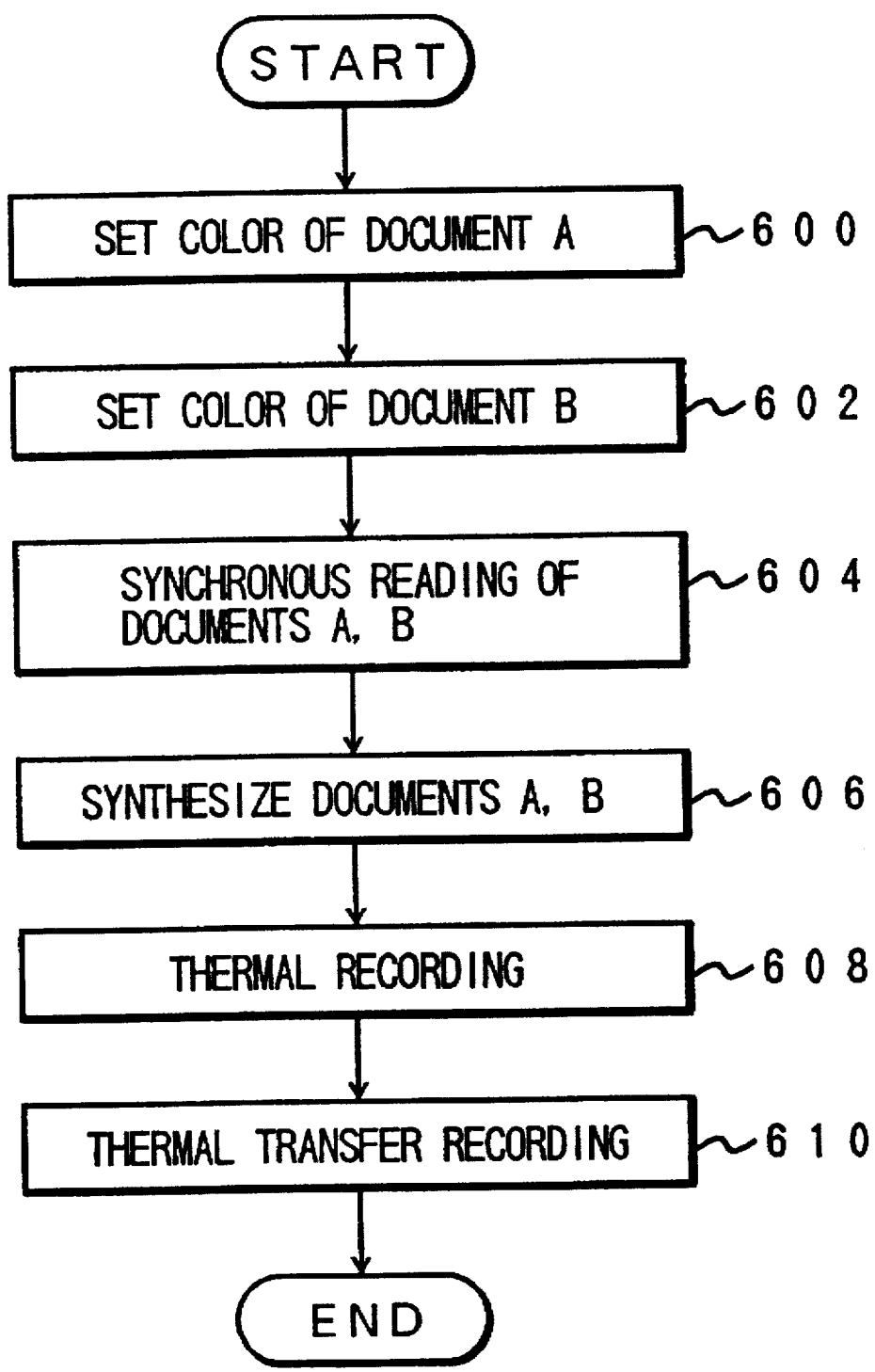
FIG. 16 is a descriptive diagram showing operation of a fourth embodiment of the present invention.

FIG. 16 is a flowchart showing operation of an overlap printing according to a fourth embodiment. In this embodiment, several scanners are synchronized with each other, so that a synthesized image is printed out while reading several images. When the number of documents is two, in addition to the scanner 42, another scanner 42A is provided together with an interface 68bA (FIG. 7). In operation, the color of the document B is set (step 602) after setting the color of the document A to a monochrome color (step 600). The coloring information is stored in the memory.

Then, the documents A, B are set on and read by the respective scanner 42, 42A synchronized with each other (step 604). The images of documents A, B are merged or synthesized with each other synchronously with the reading operation (step 606), and input to the printer 14 at the same time. In this case, of course, the thermal recording is performed (step 608) before the thermal transfer printing is performed (step 610).

In the embodiment, several scanners are used for scanning respective documents, so that the print-out can be made by synthesizing images while reading the several documents at the same time. In this case, the apparatus size becomes large, but time required for image reading can be reduced. Further, even if the portions thermally transferred are overlapped with each other, color mixture between the overlapped portions can be prevented by setting priorities between documents to be printed by the thermal transfer recording.

As such above, in the third and fourth embodiments, the thermal transfer donor sheet contains a desensitizer for controlling or suppressing a coloring reaction between the leuco dye and developer. After thermally recording the first document on the thermal recording sheet, another document is recorded by the thermal transfer recording. Accordingly, even if multicolor printing is performed by overlapping plural documents, no color mixture occurs between a portion thermally developed and a portion thermally transferred, so that bright and clear multicolor printing is possible.

Fifth Embodiment

Another Example of Printer

The printer 14 described above includes three ink ribbons 154 and a thermal head. The thermal head is used for both the thermal recording and the thermal transfer recording. However, different thermal heads can be provided for the thermal recording and the thermal transfer recording. Such a printer having different thermal heads will be described hereinbelow. This embodiment differs only in the print head 28 from the above embodiments, so that the description of elements common to the other embodiments is omitted.

Figure 17:
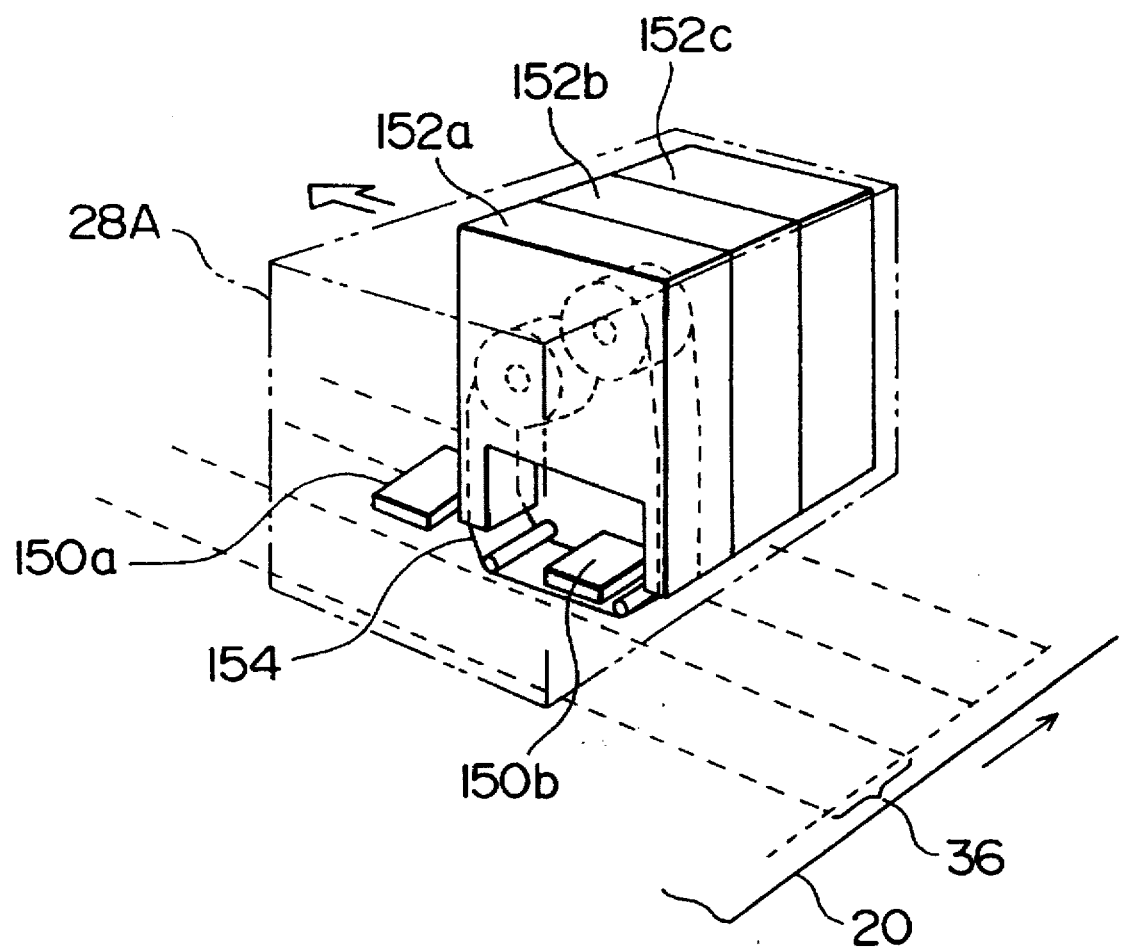
FIG. 17 is a flowchart showing operation of an arrangement of a printer head according to a fifth embodiment of the present invention.

As shown in FIGS. 17, 18, the print heads 28A, 28B of the embodiment each include a thermal head 150a for thermal recording and plural thermal heads 150b for thermal transfer recording. The thermal heads 150b for thermal transfer recording are the same in number as the ink ribbons to be used, that is, the thermal heads 150b are provided for respective ribbon cases 152 individually. As to the location relationship between the thermal heads 150a, 150b, different kinds of arrangements are possible.

Figure 18A:
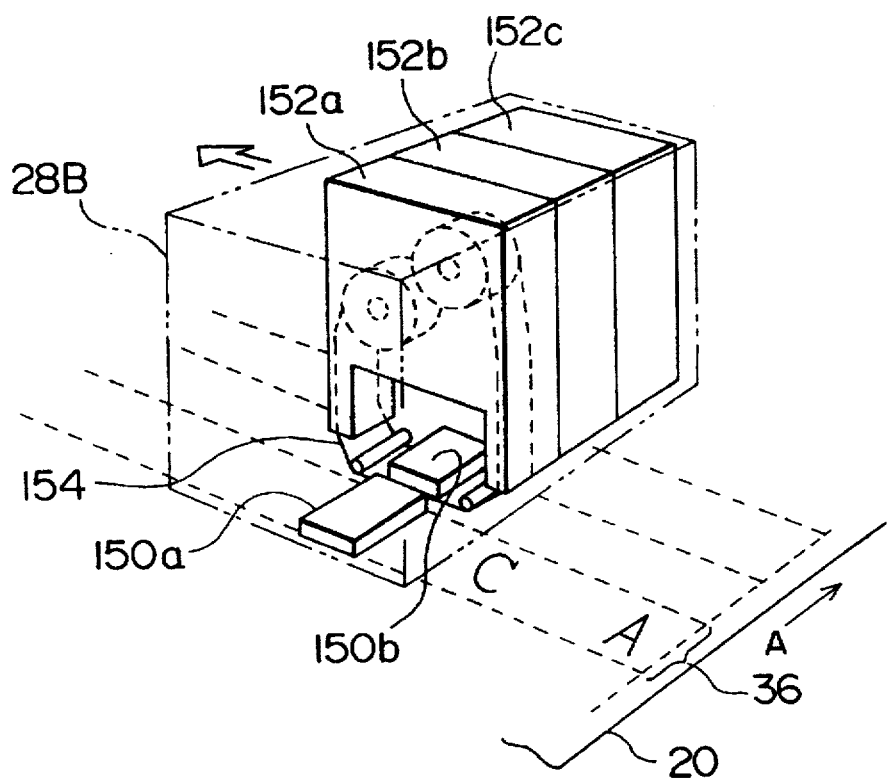
FIGS. 18A and 18B are descriptive diagram showing another arrangement of a print head and its operation according to the fifth embodiment of the present invention.

A print head 28A in FIG. 17 has the thermal heads 150a, 150b aligned in series along the feeding direction of the print head 28A; a print head 28B in FIG. 18 has the thermal heads 150a, 150b aligned with each other in the feeding direction of the paper 20, as shown with the arrow "A" in FIG. 18A, so that the thermal head 150a, 150b are moved in parallel. In both cases, the thermal head 150a performs thermal recording on the paper 20 prior to the thermal printing by the thermal head 150b as a matter of course.

In the series alignment of FIG. 17, the thermal head 150a and the thermal head 150b are arranged respectively on the front side and the rear side as the print head 28A moves from the home position HP to the forward direction. In the parallel alignment of FIG. 18, the thermal head 150A and the thermal head 150B are arranged respectively on the forth side and the back side as the paper 20 moves along the feeding direction. If the several ink ribbons 154 are provided for different colors, of course, the respective ribbon cases 152 (152a, 152b, 152c) are aligned in series in FIG. 17 and in parallel in FIG. 18.

In the series alignment of FIG. 17, the print head 28A has a long dimension in the moving direction of the print head 28A but a small dimension in the feeding direction of the paper 20. On the other hand, in the parallel alignment of FIGS. 18A and 18B, the print head 28B has a short dimension in the moving direction of the print head 28B but a large dimension in the feeding direction of the paper 20. The arrangement of the thermal heads 150A, 150B can be determined depending on the housing shape of the printer and such.

The paper 20 to be used herein is a thermal paper identical to that of the embodiment as described in FIG. 11.

The thermal head 150a is put into contact with the face of the thermal recording layer 20B on the paper 20, so that the face 20B is developed (thermal color-development) into a color, black in this embodiment, due to the reaction between the leuco dye and the developer contained in the thermal recording layer 20B. In FIG. 11A, the reference numeral 156 exhibits a color developed portion. If the thermal head 150a is heated in a prescribed coordinate position, only the prescribed coordinate position is developed with black color.

Then, the ink ribbon 154 is put on the paper 20 thermally developed already and heated by the thermal head 150b, so that coloring by the thermal transfer is performed as shown in FIG. 11B. That is, the desensitizer of the thermal transfer layer 154B on the ink ribbon inhibits the thermal recording layer 20B from being colored, whereas the color dye (or pigment) contained in the thermal transfer layer 154B is transferred onto the surface of the paper 20.

Operation of Printer

The printer according to this embodiment performs the thermal color-development and the thermal transfer printing by using both the thermal heads 150a, 150b in combination. In operation, three print heads 28 are put in the respective home positions and then the thermal head 150a is put into contact with the paper 20, as shown in FIG. 11A, to perform thermal recording (step 700 in FIG. 19).

FIG. 4 shows that each print head 28 has a moving range D in this case. If the paper 20 has a width of A1 paper size (555 mm), D is 185 mm. One-time recording operation of the print head 28 results in the thermal recording on the paper 20 by a width of the print head 28 (the width taken along the feeding direction of the paper 20; approximately 22 mm).

Figure 19:
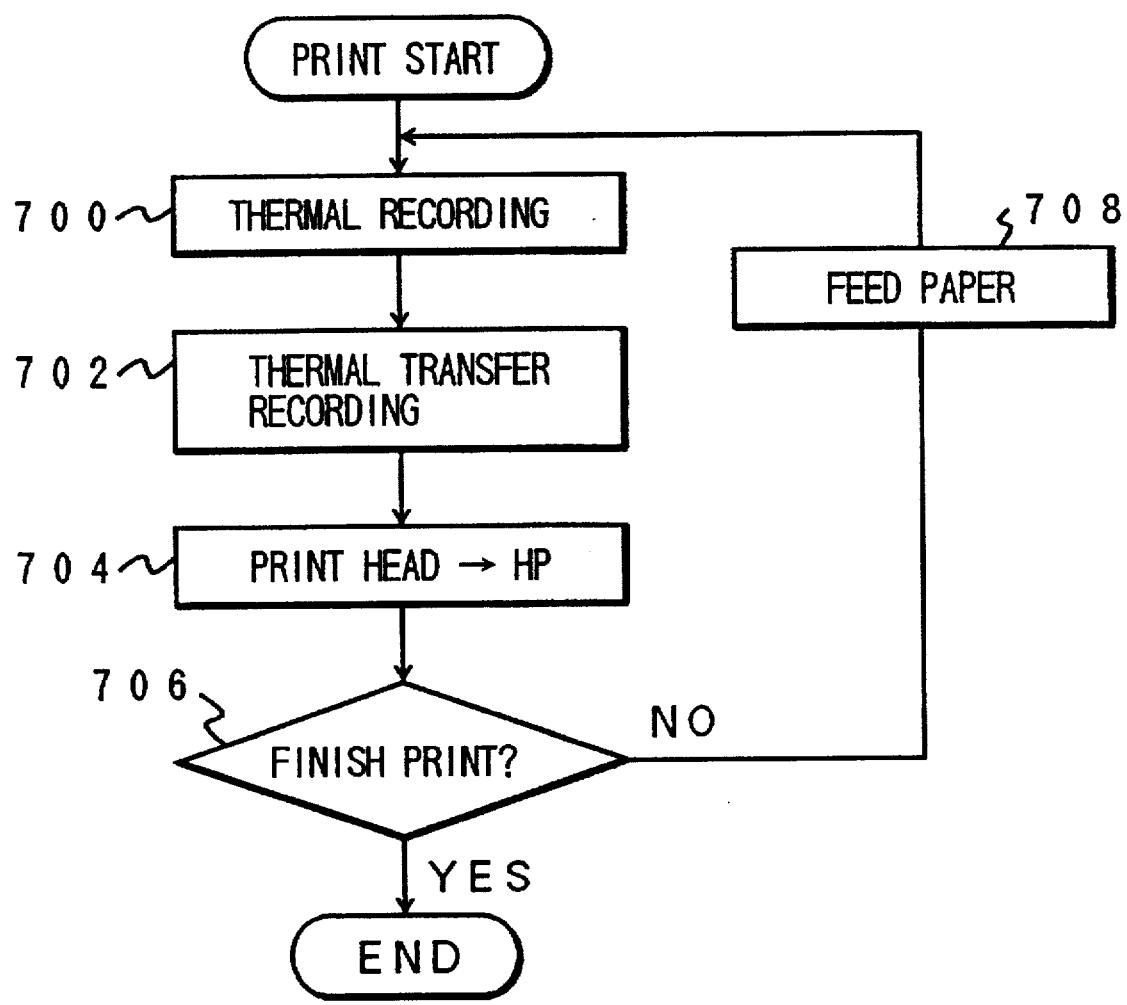
FIG. 19 is a flowchart showing operation of the print head according to the fifth embodiment of the present invention.

The thermal head 150b also starts moving with the motion of the print head 28 to perform thermal transfer recording (step 702 in FIG. 19). In the series alignment of FIG. 17, the thermal transfer recording by the thermal head 150b is performed after the thermal recording (step 700) has been performed by the thermal head 150a.

Figure 18B:
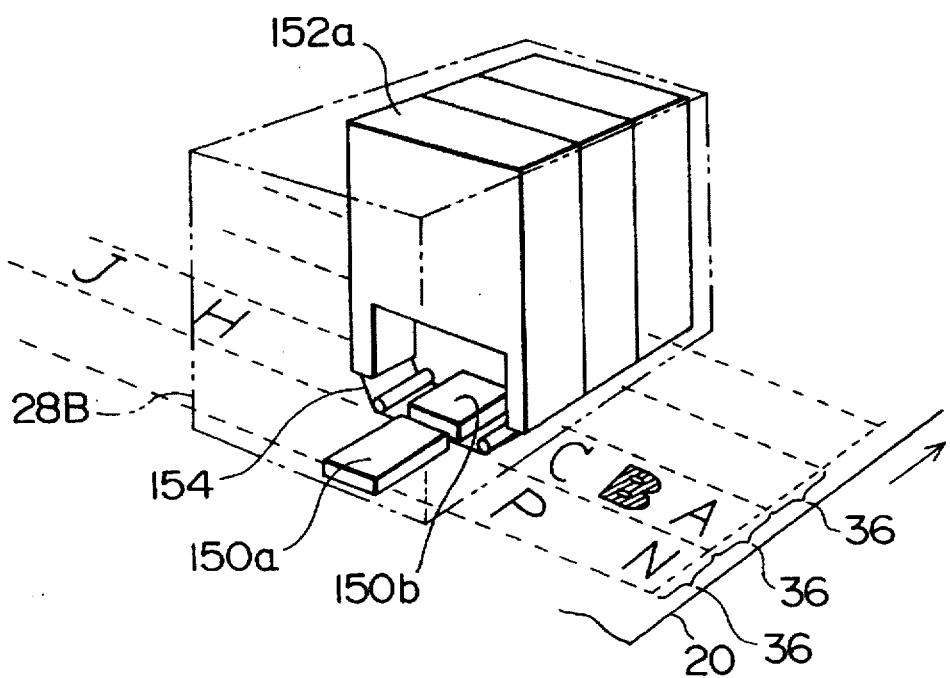

In the parallel alignment of FIG. 18A, after the thermal head 150a is energized to thermally record the printing region 36 on the adjacent side as the paper 20 moves in the feeding direction, the paper 20 is fed through a distance corresponding to the width of the printing recording region 36 (referred to as one step), so that the thermal transfer recording is performed by overlaying the thermal head 150b on the face of the same recording region (see FIG. 18B). The thermal heads 150a, 150b are operative to record, along the feeding direction of the print head 28B, the image shifted by one step (or integral multiples thereof) to the paper feeding direction. Accordingly, the memory (RAM 76) is required to have a storage capacity which corresponds to integer multiples of that for storing the images of the recording regions 36, i.e., integer multiples of the number of the thermal heads 150.

After the images of the prescribed recording regions 36 have been printed by each of the print heads 28, the print heads 28 return to the respective home positions HP (step 704) and, if not finishing the print (step 706), the paper 20 is fed one step (step 708) and the same operation is repeated.

In FIG. 18B, A, C, H and J indicate letters thermally recorded; B indicates a letter thermally transferred. The above operation is repeated in a continuous printing recording regions 36 while feeding the paper 20 intermittently. After the end operation of printing all the regions 36, the paper 20 is fed by a prescribed amount and cut out by the cutter 40.

In the embodiment, the thermal heads for thermal recording and the thermal transfer recording are provided in each of the print heads individually, so that the thermal recording and the thermal transfer recording can be performed in this order in one-time recording operation (motion) of the print head. As described in the first embodiment, when one thermal head is used for both the thermal recording and the thermal transfer recording, the print head is required to move at least two times for performing the thermal recording and the thermal transfer recording in this order. If several ink ribbons are used for thermal transfer recording, the print head must repeat the recording operation more frequently. On the contrary, in this embodiment, different thermal heads are provided for the thermal recording and the thermal transfer recording, respectively, so that the thermal recording and the thermal transfer recording can be performed in one-time recording operation (motion) of the print head, thereby making recording time short. In this case, the thermal color-development is also made prior to the thermal transfer printing, so that the color dye (pigment) and waxes transferred onto the thermal recording sheet in the thermal transfer recording does not adhere to the thermal head for thermal transfer recording. Accordingly, more clear prints can be obtained at all times.

Further, the thermal heads can be aligned in series with respect to the moving direction of the print head. In this case, the print head becomes long along the moving direction, but the length of the paper's feeding direction becomes short.

Furthermore, the thermal heads can be aligned along the paper's feeding direction. In this case, the print head becomes large with respect to the paper's feeding direction, but it becomes small with respect to the moving direction of the print head. The arrangement of these thermal heads can be selected properly depending on the housing shape of the printer.

What is claimed is:

1. A method for thermal recording and thermal transfer recording in a multicolor system, in which multicolor recording is performed on a thermal recording sheet composed of a support and a thermal recording layer thereon by using both the thermal recording and the thermal transfer recording in combination, comprising the steps of:

(a) performing thermal recording in a recording region on said thermal recording sheet by a thermal head;

(b) arranging a thermal transfer donor sheet for thermal transfer recording on said recording region of said thermal recording sheet, the thermal transfer donor sheet having a thermal transfer layer containing a desensitizer for suppressing a coloring reaction in said thermal recording layer; and (c) contacting said thermal head with the face of the thermal transfer donor sheet so that the thermal transfer recording can be performed in said recording region thermally recorded already.

2. A method for thermal recording and thermal transfer recording in a multicolor system, in which multicolor recording is performed on a thermal recording sheet composed of a support and a thermal recording layer thereon by overlapping images of plural documents using both the thermal recording and the thermal transfer recording in combination, comprising the steps of:

(a) thermally recording an image of a first document on said thermal recording sheet;

(b) arranging a thermal transfer donor sheet for thermal transfer recording on said thermal recording sheet, the thermal transfer donor sheet having a thermal transfer layer containing a desensitizer for suppressing a coloring reaction in said thermal recording layer; and (c) contacting a thermal head with the face of the thermal transfer donor sheet so that an image of a second document can be recorded, by the thermal transfer recording, on said thermal recording sheet thermally recorded already.

3. The method according to claim 2, wherein, after setting the color of said first document, the entire image of the first document is thermally recorded on the thermal recording sheet while reading it by a scanner, the thermal recording sheet is returned to its original position, and after setting the color of said second document, the image of said second document is recorded by the thermal transfer recording while reading it by said scanner.

4. The method according to claim 2, wherein, after setting the color of said first document, the coloring information is stored in a memory, after setting the color of said second document, the coloring information is stored in said memory, and after the image information and the coloring information of said first document are synthesized and recorded by the thermal recording while reading the image of said second document by said scanner, the image information and the coloring information of said second document are synthesized and recorded by the thermal transfer recording.

5. The method according to claim 2, wherein, after setting the respective colors of said first and second documents, images of said documents are synthesized with each other while reading the images of said documents by respective scanners at the same time, and the image of said first document and the image of said second document are recorded by the thermal recording and the thermal transfer recording respectively in this order.

6. An apparatus for thermal recording and thermal transfer recording in a multicolor system, in which multicolor recording is performed on a thermal recording sheet composed of a support and a thermal recording layer thereon by using both the thermal recording and the thermal transfer recording in combination, comprising:

(a) a thermal head opposite to the face of a thermal recording layer on said thermal recording sheet, which performs reciprocating motion within a range of a prescribed distance perpendicular to a feeding direction of said thermal recording sheet;

(b) means for arranging a thermal transfer donor sheet, where the thermal transfer donor sheet is arranged to be movable back and forth between said thermal recording sheet and said thermal head, the transfer donor sheet having thereon a thermal transfer layer to be thermally transferred by said thermal head, the thermal transfer layer containing a desensitizer for suppressing a coloring reaction in said thermal recording layer; and (c) print control means for perfoming the thermal recording by said thermal head in a recording region on said thermal recording sheet, and for performing the thermal transfer recording in said recording region thermally recorded already by contacting said thermal head with the thermal transfer donor sheet.

7. The apparatus according to claim 6, wherein said means for arranging said thermal transfer donor sheet is a case for housing said thermal transfer donor sheet so that said thermal head is movable within and retractable from said case.

8. The apparatus according to claim 6, wherein said thermal recording layer of said thermal recording sheet contains leuco dye and developer; and said thermal transfer layer of said thermal transfer donor sheet contains a color dye or pigment and a desensitizer for suppressing a coloring reaction between said leuco dye and developer.

9. An apparatus for thermal recording and thermal transfer recording in a multicolor system, in which multicolor recording is performed on a thermal recording sheet composed of a support and a thermal recording layer thereon by using both the thermal recording and the thermal transfer recording in combination, comprising:
  (a) a print head opposite to the face of said thermal recording layer of said thermal recording sheet, which performs reciprocating motion within a range of a prescribed distance perpendicular to a feeding direction of said thermal recording sheet;
  (b) a first thermal head for thermal recording which is provided in said print head and is opposite to the face of said thermal recording layer of said thermal recording sheet;
  (c) a second thermal head for thermal transfer recording which is provided in said print head and is opposite, through a thermal transfer donor sheet, to the face of said thermal recording layer on said thermal recording sheet, the thermal transfer donor sheet having thereon a thermal transfer layer to be thermally transferred by said first thermal head for thermal transfer recording, the thermal transfer layer containing a desensitizer for suppressing an coloring reaction on the thermal recording layer; and
  (d) print control means for performing the thermal recording on said thermal recording sheet by said first thermal head, and for performing the thermal transfer recording in the same recording region as thermally recorded, said first thermal head is overlaid on the face of said recording region, the first thermal head and the second thermal head both used in the above operation incorporated in the same print head.

10. The apparatus according to claim 9, wherein said first thermal head for thermal recording and said second thermal head for thermal transfer recording are attached to said print head, aligned with each other along the moving direction of said print head.

11. The apparatus according to claim 9, wherein the first thermal head is attached to said print head, aligned to be more forward with respect to the feeding direction of said thermal recording sheet than the second thermal head, where the thermal transfer recording is performed after feeding the recording region thermally recorded already to the feeding direction of said thermal recording sheet.

12. An apparatus for thermal recording and thermal transfer recording in a multicolor system, in which multicolor recording is performed on a thermal recording sheet composed of a support and a thermal recording layer thereon by overlapping images of plural documents using both the thermal recording and the thermal transfer recording in combination, comprising:
  (a) a memory which stores coloring information for each document;
  (b) a scanner for reading each document;
  (c) a first thermal head for thermal recording which is opposite to the face of said thermal recording layer of said thermal recording sheet, and which performs relatively reciprocating motion within a range of a prescribed distance perpendicular to a feeding direction of said thermal recording sheet;
  (d) a second thermal head for thermal transfer recording which is opposite, through a thermal transfer donor sheet, to the face of said thermal recording layer of said thermal recording sheet, the thermal transfer donor sheet having thereon a thermal transfer layer to be thermally transferred by said second thermal head for thermal transfer recording, the thermal transfer layer containing a desensitizer for suppressing a coloring reaction in said thermal recording layer; and
  (e) print control means for performing the thermal recording of a first document on said thermal recording sheet by said first thermal head, and for performing the thermal transfer recording on the same recording sheet by overlapping an image of a second document using said second head for thermal transfer recording.

13. The apparatus according to claim 12, wherein a thermal head is commonly used as said first and second thermal heads for both the thermal recording and the thermal transfer recording, which contacts and directly heats the face of said thermal recording layer at the time of thermal recording so that said recording layer can be thermally developed, and which contacts and heat the face of said thermal transfer donor sheet at the time of thermal transfer recording so that the thermal transfer printing can be performed.

* * * * *